US011240681B2

(12) United States Patent
Luo et al.

(10) Patent No.: US 11,240,681 B2
(45) Date of Patent: Feb. 1, 2022

(54) IAB NODE CELL COVERAGE ADJUSTMENT

(71) Applicant: QUALCOMM Incorporated, San Diego, CA (US)

(72) Inventors: Jianghong Luo, Skillman, NJ (US); Navid Abedini, Somerset, NJ (US); Karl Georg Hampel, Hoboken, NJ (US); Junyi Li, Chester, NJ (US); Luca Blessent, Whitehouse Station, NJ (US); Tao Luo, San Diego, CA (US); Naeem Akl, Somerville, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/092,816

(22) Filed: Nov. 9, 2020

(65) Prior Publication Data

US 2021/0160703 A1 May 27, 2021

Related U.S. Application Data

(60) Provisional application No. 62/968,452, filed on Jan. 31, 2020, provisional application No. 62/940,766, filed on Nov. 26, 2019.

(51) Int. Cl.
*H04W 16/26* (2009.01)
*H04B 7/155* (2006.01)
(Continued)

(52) U.S. Cl.
CPC ........ *H04W 16/26* (2013.01); *H04B 7/15507* (2013.01); *H04W 8/005* (2013.01);
(Continued)

(58) Field of Classification Search
CPC .................. H04B 1/0475; H04B 1/10; H04B 1/1027–2001/1045; H04B 7/15507;
(Continued)

(56) References Cited

U.S. PATENT DOCUMENTS 9,992,751 B1 6/2018 Manchanda et al.
2010/0067427 A1 3/2010 Choudhury
(Continued)

FOREIGN PATENT DOCUMENTS

EP 2466978 A1 6/2012

OTHER PUBLICATIONS

Ericsson: "Resource Allocation and Scheduling of IAB Networks", 3GPP Draft, 3GPP TSG-RAN WG1 Meeting #94bis, R1-1811513, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations, Paragraph [04.2]p. 2-p. 3; figures 1, 2.

(Continued)

*Primary Examiner* — Ronald Eisner
(74) *Attorney, Agent, or Firm* — Holland & Hart LLP

(57) ABSTRACT

Methods, systems, and devices for wireless communications are described. The described techniques provide for a first IAB node determining an adjustment to at least one parameter corresponding to a cell coverage of the first IAB node based at least in part on a geographic proximity of a cell relative to the first IAB node. For example, the first IAB node may determine to adjust the parameters based reference signal measurements, signal quality measurements (e.g., received from child nodes or user equipments (UEs)), etc. In another example, the first IAB node may receive an instruction from a central unit (CU) of the IAB network to adjust the at least one parameter. The first access node may transmit an indication of the adjustment to the at least one parameter. For example, the first access node may signal the (Continued)

adjustments to the CU, child IAB nodes, UEs and/or, other IAB nodes.

30 Claims, 13 Drawing Sheets

(51) Int. Cl.
*H04W 36/00* (2009.01)
*H04W 48/10* (2009.01)
*H04W 8/00* (2009.01)
*H04W 88/04* (2009.01)

(52) U.S. Cl.
CPC ... *H04W 36/0058* (2018.08); *H04W 36/0072* (2013.01); *H04W 48/10* (2013.01); *H04W 88/04* (2013.01)

(58) Field of Classification Search
CPC ... H04B 7/15528–15535; H04B 2201/709736; H04B 2201/709745; H04B 15/00–06; H04W 8/005; H04W 16/26; H04W 36/0058; H04W 36/0072; H04W 48/10; H04W 52/24–244; H04W 88/04
See application file for complete search history.

(56) References Cited

U.S. PATENT DOCUMENTS

| | | | |
|---|---|---|---|
| 2013/0322322 A1 | 12/2013 | Redana et al. | |
| 2014/0106769 A1* | 4/2014 | Bai | H04L 5/0032 455/452.1 |
| 2016/0006527 A1* | 1/2016 | Andrews | H04W 36/04 370/329 |
| 2019/0312619 A1 | 10/2019 | Abedini et al. | |
| 2019/0342904 A1 | 11/2019 | Islam et al. | |

OTHER PUBLICATIONS

NTT DOCOMO Inc: "Extensions of SSBs for Inter-IAB-Node Discovery and Measurements", 3GPP TSG RAN WG1 #96, 3GPP Draft; R1-1902794_Extensions of SSBs for Inter-IAB-Node Discovery and Measurements_Final, 3rd Generation Partnership Project (3gpp), Mobile Competence Centre; 650, Route Des Lucioles; F-06921 S, vol. RAN WG1, No. Athens, Greece; Feb. 25, 2019-Mar. 1, 2019, Feb. 15, 2019 (Feb. 15, 2019), pp. 1-6, XP051600489, Retrieved from the Internet: URL: http://www.3gpp.org/ftp/tsg%5Fran/WG1%5FRL1/TSGR1%5F96/Docs/R1%2D1902794%2Ezip [retrieved on Feb. 15, 2019], The whole document.
Partial International Search Report—PCT/US2020/059796—ISA/EPO—Mar. 3, 2021.
QUALCOMM Incorporated: "IAB Resource Management Framework", 3GPP Draft, 3GPP TSG RAN WG1 Meeting AH1901, R1-1900881, IAB Resource Management Framework, 3rd Generation Partnership Project (3GPP), Mobile Competence Centre, 650, Route Des Lucioles, F-06921, Sophia-Antipolis Cedex, France, vol. RAN WG1. No. Taipei, Taiwan; Jan. 21, 2019-Jan 25, 2019, Jan. 20, 2019 (Jan. 20, 2019), XP051593727, Jan. 12, 2019 (Jan. 12, 2019), 8 Pages, Retrieved from the Internet: URL: http://www.3gpp.org/ftp/Meetings%5F3GPP%5FSYNC/RAN1/Docs/R1%2D1900881%2Ezip [retrieved on Jan. 20, 2019], 1st bullet, p. 4, p. 1. line 13. paragraph 2—line 15, p. 2. line 1. paragraph 3.1—line 4, p. 3, figure 1, page 4, figure 2, p. 4. line 1. paragraph 3.2.1—p. 5, line 20, Proposal 1 and 2, p. 5, paragraphs [0002], [03.2], [retrieved on Jan. 12, 2019] figures 2-3, section 2, section 3.2, figure 2, section 3.3, the whole document.
Huawei: "Basic Principles for IAB Topology Adaptation", 3GPP Draft, 3GPP TSG-RAN WG3 #101, R3-184805, Basic Principles for IAB Topology Adaptation, 3rd Generation Partnership Project (3GPP), Mobile Competence Centre, 650, Route Des Lucioles, F-06921 Sophia-Antipolis Cedex, Fr, vol. RAN WG3, No. Gothenburg, Sweden, Aug. 20, 2018-Aug. 24, 2018, Aug. 10, 2018 (Aug. 10, 2018), XP051528149, 4 Pages, Retrieved from the Internet: URL: http://www.3gpp.org/ftp/tsg%5Fran/WG3%5Flu/TSGR3%5F101/Docs/R3%2D184805%2Ezip. [retrieved on Aug. 10, 2018] p. 2-p. 3.
Huawei., et al., "Consideration on Cross-Link Interference in IAB", 3GPP Draft, 3GPP TSG RAN WG1 Meeting #95, R1-1812203, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), 10 pages, XP051554075, Retrieved from the Internet: URL: http://www.3gpp.org/ftp/Meetings%5F3GPP%5FSYNC/RAN1/Docs/R1%2D1812283%2Ezip, [retrieved on Nov. 11, 2018] Consideration on CLI measurement framework; p. 5, paragraph 3.1—p. 7; figures 8, 9 Consideration on CLI mitigation method; p. 7, paragraph 3.2—p. 8.
Interdigital Inc: "On Integrated Access Link and Backhaul inNR", 3GPP Draft, 3GPP TSG RAN WG1 Meeting #94bis, R1-1811208, 3rd GenerationPartnership Project (3GPP), Mobile Competence Centre, 650, Route Des Lucioles, F-06921Sophia-Anti Polls Cedex, France, vol. RAN WG1, No. Chengdu, China, Oct. 8, 2018-Oct. 12, 2018, Sep. 29, 2018 (Sep. 29, 2018), XP051518609, 4 Pages, Retrieved fromthe Internet: URL:http://www.3gpp.org/ftp/tsg%5Fran/WG1%5FRL1/TSGR1%5F94b/Docs/R1%2D1811208%2Ezip[retrieved on Sep. 29, 2018] Section 2.1, figure 1.
International Search Report and Written Opinion—PCT/US2020/059796—ISA/EPO—dated Jun. 21, 2021.
NTT DOCOMO., et al., "Discussion on Enhancements to Support NR Backhaul Links", 3GPP Draft, 3GPP TSG RAN WG1 Meeting #95, R1-1813316, Discussion on Enhancements to Support NR Backhaul Links Final, 3rd Generation Partnership Project (3GPP), Mobile Competence Centre, 650, Route Des Lucioles, F-06921 Sophia-Ant, vol. RAN WG1, No. Spokane, USA, Nov. 12, 2018-Nov. 16, 2018, Nov. 11, 2018 (Nov. 11, 2018), XP051555343, 10 pages, Retrieved from the Internet: URL: http://www.3gpp.org/ftp/Meetings%5F3GPP%5FSYNC/RAN1/Docs/R1%2D1813316%2Ezip. [retrieved on Nov. 11, 2018] pp. 1-9.
QUALCOMM Incorporated: "Proposal for RACH Extension for IAB", 3GPP Draft, 3GPP TSG RAN WG1 Meeting #96, R1-1902991,7.2.3.3 Proposal for RACH Extension for IAB, 3rd Generation Partnership Project (3GPP), Mobile Competence Centre, 650, Route Des Lucioles, F-06921 Sophia-Antipolis Cedex, Fr, vol. RAN WG1, No. Athens, Greece, Feb. 25, 2019-Mar. 1, 2019, Feb. 16, 2019 (Feb. 16, 2019), XP051600688, 8 Pages, Retrieved from the Internet: URL: http://www.3gpp.org/ftp/tsg%5Fran/WG1%5FRL1/TSGR1%5F96/Docs/R1%2D1902991%2Ezip. [retrieved on Feb. 16, 2019] p. 6, paragraphs 4, 5.

\* cited by examiner

IAB NODE CELL COVERAGE ADJUSTMENT

CROSS REFERENCE

The present Application for Patent claims the benefit of U.S. Provisional Patent Application No. 62/940,766 by LUO et al., entitled "TAB NODE CELL COVERAGE ADJUSTMENT," filed Nov. 26, 2019, and to U.S. Provisional Patent Application No. 62/968,452 by LUO et al., entitled "TAB NODE CELL COVERAGE ADJUSTMENT" filed Jan. 31, 2020, assigned to the assignee hereof, and expressly incorporated herein.

FIELD OF TECHNOLOGY

The following relates generally to wireless communications and more specifically to TAB node cell coverage adjustment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include a number of access nodes or network access nodes, each simultaneously supporting communication for multiple communication devices, which may be otherwise known as user equipment (UE). Network access nodes may have a high-capacity, wired, backhaul connection to the network. In some deployments, however, it may be desirable to deploy a larger quantity of access nodes (e.g., in a small area) to provide acceptable coverage to users. In such deployments, it may be impractical to connect each access node to the network via a wired connection, and some networks or portions thereof may be configured as integrated access and backhaul (IAB) networks in which one or more access nodes of the network may have wireless backhaul connections to the network. In some IAB networks, access node mobility (e.g., a mobile IAB node) may impact network performance by causing interference between access nodes or between access nodes and UEs.

SUMMARY

The described techniques relate to improved methods, systems, devices, and apparatuses that support integrated access and backhaul (IAB) node cell coverage adjustment. Generally, the described techniques provide for a first relay node (IAB node) determining that a cell coverage of the first cell corresponding to the first relay node is in geographic proximity to a second cell. The relay node may adjust at least one parameter corresponding to the cell coverage of the relay IAB node based at least in part on a geographic proximity of the second cell relative to the first IAB node. For example, the first IAB node may determine to adjust the parameters based on one or more reference signal measurements, one or more signal quality measurements (e.g., received from child nodes or user equipments (UEs)), etc. In another example, the first IAB node may receive an instruction from a central unit (CU) of the IAB network to adjust the at least one parameter. The first access node may transmit an indication of the adjustment to the at least one parameter. For example, the first access node may signal the adjustments to the CU, child IAB nodes, UEs and/or, other IAB nodes.

A method for wireless communications at a first relay node of a wireless backhaul communications network is described. The method may include determining that a cell coverage of a first cell corresponding to the first relay node is in geographic proximity of a second cell, adjusting at least one parameter corresponding to the cell coverage of the first cell of the first relay node based on the geographic proximity of the second cell, and transmitting information that indicates that the first relay node is adjusting the cell coverage.

An apparatus for wireless communications at a first relay node of a wireless backhaul communications network is described. The apparatus may include a processor, memory in electronic communication with the processor, and instructions stored in the memory. The instructions may be executable by the processor to cause the apparatus to determine that a cell coverage of a first cell corresponding to the first relay node is in geographic proximity of a second cell, adjust at least one parameter corresponding to the cell coverage of the first cell of the first relay node based on the geographic proximity of the second cell, and transmit information that indicates that the first relay node is adjusting the cell coverage.

Another apparatus for wireless communications at a first relay node of a wireless backhaul communications network is described. The apparatus may include means for determining that a cell coverage of a first cell corresponding to the first relay node is in geographic proximity of a second cell, means for adjusting at least one parameter corresponding to the cell coverage of the first cell of the first relay node based on the geographic proximity of the second cell, and means for transmitting information that indicates that the first relay node is adjusting the cell coverage.

A non-transitory computer-readable medium storing code for wireless communications at a first relay node of a wireless backhaul communications network is described. The code may include instructions executable by a processor to determine that a cell coverage of a first cell corresponding to the first relay node is in geographic proximity of a second cell, adjust at least one parameter corresponding to the cell coverage of the first cell of the first relay node based on the geographic proximity of the second cell, and transmit information that indicates that the first relay node is adjusting the cell coverage.

In some examples of the method, apparatuses, and non-transitory computer-readable medium described herein, determining that the cell coverage may be in geographic proximity of the second cell may include operations, features, means, or instructions for identifying that a measurement corresponding to the cell coverage of the first relay node indicates that the cell coverage may be interfering with communications in the second cell, that the second cell may be interfering with communications in the first cell, or both.

Some examples of the method, apparatuses, and non-transitory computer-readable medium described herein may further include operations, features, means, or instructions for performing the measurement of at least one reference signal transmitted by a second relay node corresponding to the second cell, where the performed measurement indicates the geographic proximity of the second cell.

In some examples of the method, apparatuses, and non-transitory computer-readable medium described herein, the second relay node may be a parent relay node of the first relay node and the measurement may be performed by a mobile-termination unit of the first relay node.

In some examples of the method, apparatuses, and non-transitory computer-readable medium described herein, the second relay node may be a child relay node of the first relay node and the measurement may be performed by a distributed unit of the first relay node.

In some examples of the method, apparatuses, and non-transitory computer-readable medium described herein, the measurement corresponds to radio resource management for a handover procedure, an inter-relay discovery procedure, or both.

In some examples of the method, apparatuses, and non-transitory computer-readable medium described herein, the at least one reference signal includes a synchronization signal block, a channel state information reference signal, a demodulation reference signal, a sounding reference signal, or a combination thereof.

In some examples of the method, apparatuses, and non-transitory computer-readable medium described herein, the measurement corresponds to a reference signal received power, a reference signal received quality, a signal-to-interference plus noise ratio, a received signal strength indicator, a channel quality indicator, or a combination thereof.

Some examples of the method, apparatuses, and non-transitory computer-readable medium described herein may further include operations, features, means, or instructions for receiving an indication of the measurement from a second relay node, where the indication of the measurement corresponds to the geographic proximity of the second cell.

Some examples of the method, apparatuses, and non-transitory computer-readable medium described herein may further include operations, features, means, or instructions for determining that the measurement exceeds a cell measurement threshold, where the adjusting may be performed based on determining that the measurement exceeds the cell measurement threshold.

Some examples of the method, apparatuses, and non-transitory computer-readable medium described herein may further include operations, features, means, or instructions for receiving an indication that the measurement exceeds a cell measurement threshold, where the adjusting may be performed based on receiving the indication.

Some examples of the method, apparatuses, and non-transitory computer-readable medium described herein may further include operations, features, means, or instructions for transmitting an indication of the measurement, an indication of the adjusting, or a request for the adjusting to a central unit via an F1 application protocol message, a radio resource control message, or a medium access control element message.

In some examples of the method, apparatuses, and non-transitory computer-readable medium described herein, the indication of the adjusting includes a list of power management policies, selection criterion associated with power management policies, or both.

In some examples of the method, apparatuses, and non-transitory computer-readable medium described herein, the power manage policy includes a formula, a set of configured parameters, or both.

In some examples of the method, apparatuses, and non-transitory computer-readable medium described herein, the indication of the adjustment, the indication of the measurement, or the request for the adjustment may be transmitted vi an F1 application protocol message, a radio resource control message, or a medium access control layer control element message.

In some examples of the method, apparatuses, and non-transitory computer-readable medium described herein, adjusting the at least one parameter may include operations, features, means, or instructions for adjusting a maximum transmission power, adjusting a random access channel configuration, adjusting the cell coverage in one or more spatial directions, or a combination thereof.

Some examples of the method, apparatuses, and non-transitory computer-readable medium described herein may further include operations, features, means, or instructions for broadcasting a system information block indicating an updated set of synchronization signal blocks corresponding to the one or more spatial directions.

In some examples of the method, apparatuses, and non-transitory computer-readable medium described herein, adjusting the at least one parameter may include operations, features, means, or instructions for adjusting the cell coverage of the first relay node in one or more spatial directions in accordance with the determining by applying a first transmit power to a first synchronization signal block in a first direction and a second transmit power to a second synchronization signal block in a second direction based on the geographic proximity of the second cell.

In some examples of the method, apparatuses, and non-transitory computer-readable medium described herein, adjusting the at least one parameter may include operations, features, means, or instructions for adjusting the cell coverage of the first relay node in one or more spatial directions in accordance with the determining by determining to not transmit on at least one synchronization signal block based on the geographic proximity of the second cell.

In some examples of the method, apparatuses, and non-transitory computer-readable medium described herein, adjusting the at least one parameter may include operations, features, means, or instructions for switching to a power saving mode in accordance with the adjusting.

In some examples of the method, apparatuses, and non-transitory computer-readable medium described herein, adjusting the at least one parameter may include operations, features, means, or instructions for rejecting a random access request from at least one child relay node of the first relay node in accordance with the adjusting.

In some examples of the method, apparatuses, and non-transitory computer-readable medium described herein, transmitting the information may include operations, features, means, or instructions for transmitting an indication of a maximum uplink power to one or more UEs served by the first relay node.

In some examples of the method, apparatuses, and non-transitory computer-readable medium described herein, transmitting the information may include operations, features, means, or instructions for performing a handover procedure for one or more UEs served by the first relay node.

Some examples of the method, apparatuses, and non-transitory computer-readable medium described herein may further include operations, features, means, or instructions for receiving an indication of the selection criterion.

Some examples of the method, apparatuses, and non-transitory computer-readable medium described herein may further include operations, features, means, or instructions for selecting a power management policy based on measurement information and a selection criterion, where adjusting the at least one parameter may be based on the selected power management policy.

Some examples of the method, apparatuses, and non-transitory computer-readable medium described herein may further include operations, features, means, or instructions for transmitting, to a central unit, an indication of a measurement corresponding to the cell coverage and receiving, from the central unit, an instruction to adjust the at least one parameter based on transmitting the indication of the measurement, where the adjusting may be performed in accordance with the instruction.

In some examples of the method, apparatuses, and non-transitory computer-readable medium described herein, the information includes updated values for the at least one parameters corresponding to the cell coverage, a timing for the adjusting, an identification of a second relay node corresponding to the second cell, a handover request, synchronization signal block parameters, or a combination thereof.

In some examples of the method, apparatuses, and non-transitory computer-readable medium described herein, the indication of the adjusting includes a handover request indicating one or more child relay nodes of the first relay node.

Some examples of the method, apparatuses, and non-transitory computer-readable medium described herein may further include operations, features, means, or instructions for transmitting a system information block including an indication of the adjusting to the at least one parameter to one or more child relay nodes served by the first relay node.

Some examples of the method, apparatuses, and non-transitory computer-readable medium described herein may further include operations, features, means, or instructions for identifying one or more child relay nodes served by the first relay node for a handover procedure based on the determined adjusting, an amount of reduction in transmit power by the first relay node, a signal quality corresponding to the one or more child relay nodes, or a combination thereof.

In some examples of the method, apparatuses, and non-transitory computer-readable medium described herein, the signal quality may be based on a channel state information report received from the one or more child relay nodes, sounding reference signal measurements, block error rate performance of the one or more child relay nodes, or a combination thereof.

Some examples of the method, apparatuses, and non-transitory computer-readable medium described herein may further include operations, features, means, or instructions for identifying the second relay node correspond to the cell as a target node for the handover procedure.

A method for wireless communications at a central unit of a wireless backhaul communications network is described. The method may include receiving, from a relay node, an indication of a geographic proximity of a cell relative to the first relay node and transmitting an indication of an adjustment of at least one parameter corresponding to cell coverage based on receiving the indication of the geographic proximity.

An apparatus for wireless communications at a central unit of a wireless backhaul communications network is described. The apparatus may include a processor, memory in electronic communication with the processor, and instructions stored in the memory. The instructions may be executable by the processor to cause the apparatus to receive, from a relay node, an indication of a geographic proximity of a cell relative to the first relay node and transmit an indication of an adjustment of at least one parameter corresponding to cell coverage based on receiving the indication of the geographic proximity.

Another apparatus for wireless communications at a central unit of a wireless backhaul communications network is described. The apparatus may include means for receiving, from a relay node, an indication of a geographic proximity of a cell relative to the first relay node and means for transmitting an indication of an adjustment of at least one parameter corresponding to cell coverage based on receiving the indication of the geographic proximity.

A non-transitory computer-readable medium storing code for wireless communications at a central unit of a wireless backhaul communications network is described. The code may include instructions executable by a processor to receive, from a relay node, an indication of a geographic proximity of a cell relative to the first relay node and transmit an indication of an adjustment of at least one parameter corresponding to cell coverage based on receiving the indication of the geographic proximity.

In some examples of the method, apparatuses, and non-transitory computer-readable medium described herein, receiving the indication may include operations, features, means, or instructions for receiving an indication of a measurement corresponding to the cell coverage of the first relay node indicating the geographic proximity, where the adjustment of the at least one parameter may be determined in accordance with the measurement.

In some examples of the method, apparatuses, and non-transitory computer-readable medium described herein, the measurement corresponds to a one or more signals of a synchronization signal block, a channel state information reference signal, a demodulation reference signal, a sounding reference signal, a reference signal received power, a reference signal received quality, a signal to interference plus noise ratio, a received signal strength indicator, a channel quality indicator, a block error rate performance, or a combination thereof.

In some examples of the method, apparatuses, and non-transitory computer-readable medium described herein, the measurement corresponds to a child relay node of the first relay node, a parent relay node of the first relay node, a second relay node, another wireless communication node, or a combination thereof.

Some examples of the method, apparatuses, and non-transitory computer-readable medium described herein may further include operations, features, means, or instructions for determining that the measurement exceeds a cell measurement threshold, where the adjustment of the at least one parameter may be determined in accordance with determining that the measurement exceeds the cell measurement threshold.

Some examples of the method, apparatuses, and non-transitory computer-readable medium described herein may further include operations, features, means, or instructions for identifying a list of child relay nodes for a handover procedure based on the measurement, an amount of transmission power reduction, or both.

In some examples of the method, apparatuses, and non-transitory computer-readable medium described herein, the list may be identified based on a signal quality of a channel between each child relay node and the first relay node.

Some examples of the method, apparatuses, and non-transitory computer-readable medium described herein may further include operations, features, means, or instructions for transmitting the indication of the adjustment to the first relay node, a second relay node corresponding to the cell, or a combination thereof.

In some examples of the method, apparatuses, and non-transitory computer-readable medium described herein, the at least one parameter includes a maximum transmission power, a random access channel configuration, or both.

In some examples of the method, apparatuses, and non-transitory computer-readable medium described herein, transmitting the indication of the adjustment of the at least one parameter may include operations, features, means, or instructions for transmitting the indication to adjust the cell coverage in one or more spatial directions.

In some examples of the method, apparatuses, and non-transitory computer-readable medium described herein, the indication specifies to apply a first transmit power to a first synchronization signal block in a first direction and a second transmit power to a second synchronization signal block in a second direction based on the geographic proximity of the cell.

In some examples of the method, apparatuses, and non-transitory computer-readable medium described herein, the indication specifies to not transmit on at least one synchronization signal block based on the geographic proximity of the cell.

In some examples of the method, apparatuses, and non-transitory computer-readable medium described herein, the indication of the adjustment specifies to enter into a power saving mode based on the geographic proximity of the cell.

In some examples of the method, apparatuses, and non-transitory computer-readable medium described herein, the indication of the adjustment specifies to reject a random access request.

In some examples of the method, apparatuses, and non-transitory computer-readable medium described herein, the indication of the adjustment specifies updated values for the at least one parameters corresponding to the cell coverage, a timing for the adjustment, an identification of a second relay node corresponding to the cell, a handover request, synchronization signal block parameters, or a combination thereof.

In some examples of the method, apparatuses, and non-transitory computer-readable medium described herein, the indication of the adjustment includes a list of power management policies, a selection criterion for power management policies, or both.

In some examples of the method, apparatuses, and non-transitory computer-readable medium described herein, receiving the indication of the geographic proximity may include operations, features, means, or instructions for receiving a request to adjust the at least one parameter from the first relay node, where the indication of the adjustment may be transmitted in accordance with the request.

Some examples of the method, apparatuses, and non-transitory computer-readable medium described herein may further include operations, features, means, or instructions for selecting either the first relay node or a second relay node corresponding to the cell for the adjustment of the at least one parameter, where the indication of the adjustment may be transmitted to either the first relay node or the second relay node in accordance with the selecting.

Some examples of the method, apparatuses, and non-transitory computer-readable medium described herein may further include operations, features, means, or instructions for identifying a first number of child relay nodes served by the first relay node and second number of child relay nodes served by the second relay node, where either the first relay node or the second relay node may be selected based on a lower number of the first number and the second number.

Some examples of the method, apparatuses, and non-transitory computer-readable medium described herein may further include operations, features, means, or instructions for identifying a first mobility state corresponding to the first relay node and a second mobility state corresponding to the second relay node, where either the first relay node or the second relay node may be selected based on a higher mobility between the first mobility state and the second mobility state.

Some examples of the method, apparatuses, and non-transitory computer-readable medium described herein may further include operations, features, means, or instructions for identifying a first power consumption metric corresponding to the first relay node and a second power consumption metric corresponding to the second relay node, where either the first relay node or the second relay node may be selected based on a higher power consumption between the first power consumption metric and the second power consumption metric.

Some examples of the method, apparatuses, and non-transitory computer-readable medium described herein may further include operations, features, means, or instructions for identifying a first hop count between the first relay node and a donor node and a second hop count between the second relay node and the donor node, where either the first relay node or the second relay node may be selected based on a higher hop count between the first hop count and the second hop count.

Some examples of the method, apparatuses, and non-transitory computer-readable medium described herein may further include operations, features, means, or instructions for transmitting an indication of the selection to the first relay node, the second relay node, or both.

Some examples of the method, apparatuses, and non-transitory computer-readable medium described herein may further include operations, features, means, or instructions for identifying a second relay node corresponding to the cell as a target relay node for a handover procedure between the first relay node and the second relay node.

Some examples of the method, apparatuses, and non-transitory computer-readable medium described herein may further include operations, features, means, or instructions for transmitting an indication of the handover procedure to the first relay node, the second relay node, or both.

In some examples of the method, apparatuses, and non-transitory computer-readable medium described herein, the indication of the handover procedure includes an identification of one or more child relay nodes for the handover procedure.

Some examples of the method, apparatuses, and non-transitory computer-readable medium described herein may further include operations, features, means, or instructions for receiving the indication via a F1 application protocol message or a radio resource control message.

Some examples of the method, apparatuses, and non-transitory computer-readable medium described herein may further include operations, features, means, or instructions for transmitting the indication via a F1 application protocol message or a radio resource control message.

DETAILED DESCRIPTION

Figure 1:
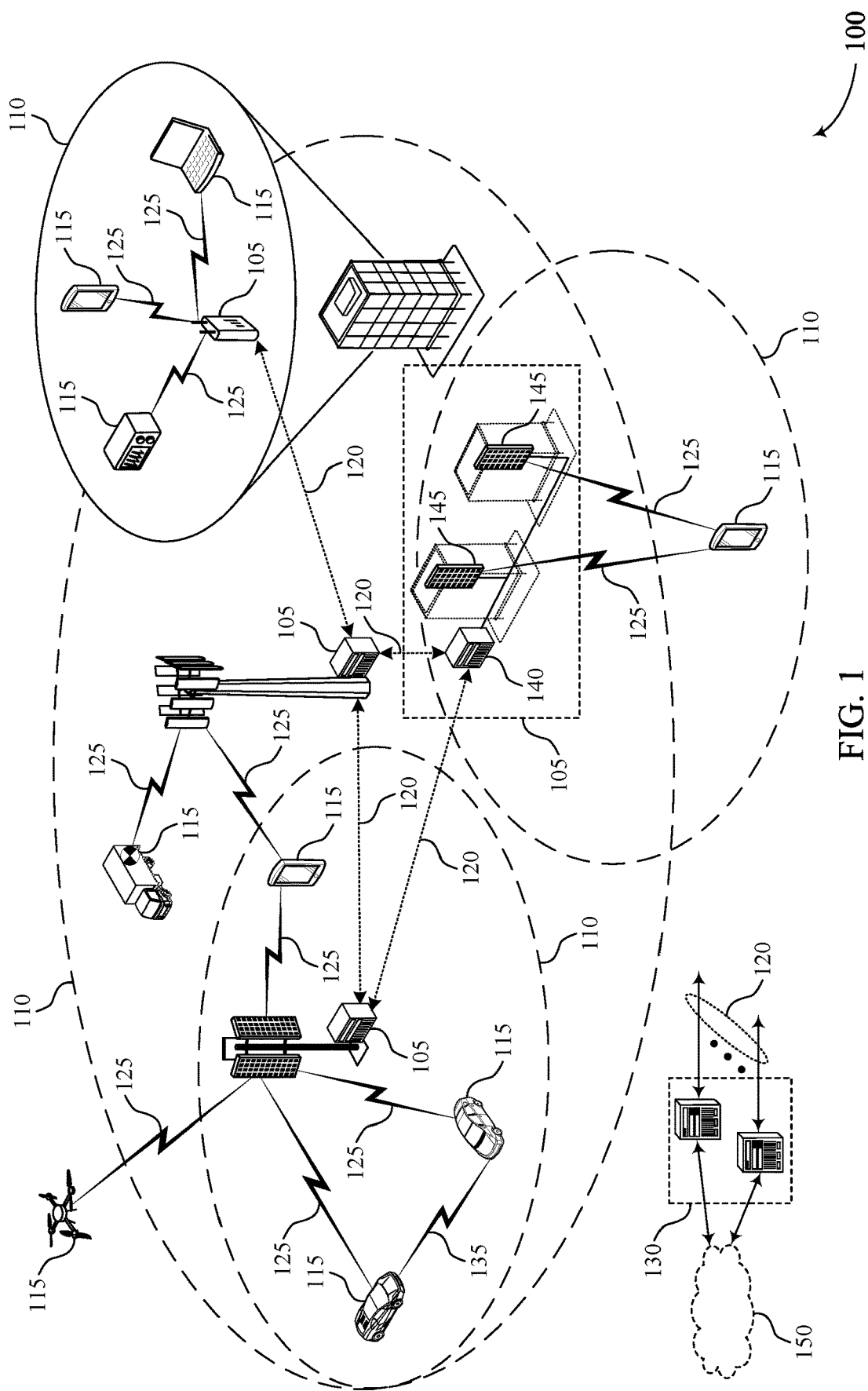
FIG. 1 illustrates an example of a system for wireless communications that supports integrated access and backhaul (IAB) node cell coverage adjustment in accordance with aspects of the present disclosure.

A first integrated access and backhaul (IAB) node (e.g., of an IAB network) may adjust cell coverage parameters based on detection of a cell of a second IAB node within a defined geographic proximity. The second IAB node may be detected based on one or more cell measurements of the cell corresponding to the first IAB node. The detection may be made by either the first IAB node or by an access node central unit (CU) (e.g., based on measurement reports). The first IAB node may decrease a cell coverage if it is determined that the second access node is within a defined proximity and/or if one or more other conditions are met. The first IAB node may increase a cell coverage or keep a cell coverage constant if it is determined that no other access nodes are within a defined proximity or if the one or more conditions are not met.

In some wireless networks, access nodes may communicate with other access nodes via one or more wireless backhaul links and may communicate with user equipments (UEs) via one or more wireless access links. An access node may receive data or control information via the one or more wireless backhaul links and may forward the data or the control information to a child access node (e.g., via one or more wireless backhaul links) or to a UE (e.g., via one or more wireless access links). Some wireless networks may include a mobile IAB network, in which one or more access nodes (e.g., IAB nodes) may move, or change a physical location, within the network. A mobile IAB node may support communications with one or more child UEs and/or one or more child access nodes.

In one example, a mobile IAB node may move within a network, such that a location of the mobile IAB node may change with time. The mobile IAB node may have a coverage area, which may support communications with one or more UEs or other IAB nodes (e.g., other access nodes). In some cases, the mobile IAB node may come within a defined proximity of a cell corresponding to a second node (e.g., an IAB node (e.g., a stationary or a mobile IAB node), or other wireless network node), such that if both the mobile IAB node and the second node transmit with full power (e.g., or above a threshold power) their respective coverage areas may completely or partially overlap. In some overlapping coverage areas, interference may occur between downlink or uplink communications associated with the two IAB nodes. Connected child nodes (e.g., UEs and/or other IAB nodes) of one or both IAB nodes may experience at least some radio link failure due to the interference. In some cases, the interference may not affect communications with the connected child nodes, but if one or more child nodes of the mobile IAB node are served by the second IAB node, the mobile IAB node may be redundant.

To reduce interference and/or save power, an IAB node may adjust a coverage area based on detection of a cell corresponding to a second node within a defined proximity. The cell may be detected based on measurements corresponding to the IAB node, such as reference signal measurements of child and/or parent links of the IAB node, signal quality measurements, signal quality reports, etc. The detection may be made by either the IAB node (e.g., based on a mobile termination (MT) signal measurement) or by a network CU (e.g., based on measurement reports). An IAB node may reduce the coverage area (e.g., reduce a maximum transmission power, reduce transmission power in one or more spatial directions, enter a sleep state, or a cell-a barred state, etc.) if it is determined that a second IAB node is within a defined proximity and/or if one or more other conditions (e.g., conditions defined by one or more parameters) are met. An IAB node may increase a coverage area (e.g., increase a maximum transmit power, increase a maximum transmit power in one or more spatial directions, enter a transmission state) if it is determined that no other IAB nodes are within a defined proximity and/or if one or more other parameters are not met.

A determination to adjust a coverage area may be made at the IAB node and indicated to the CU, or may be made at the CU and indicated to the IAB node. Once it is determined that an IAB node is to reduce a coverage area, some or all of its connected child nodes may be handed over to another parent IAB node. The IAB node may notify its child devices of the handover procedures, may perform the handover procedure, and adjust the coverage area. By adjusting the coverage area, the IAB node may lower an amount of interference experienced by one or more UEs or other IAB nodes, or may save power, among other benefits. The CU may initiate a handover procedure to hand over child devices (e.g., new child devices and/or previous child devices) from one or more other IAB nodes to the mobile IAB node, and the corresponding devices may perform the handover procedure.

Aspects of the disclosure are initially described in the context of wireless communications systems. Aspects of the disclosure are further described in the context of IAB environments and process flow diagrams. Aspects of the disclosure are further illustrated by and described with reference to apparatus diagrams, system diagrams, and flowcharts that relate to IAB node cell coverage adjustment.

FIG. 1 illustrates an example of a wireless communications system 100 that supports IAB node cell coverage adjustment in accordance with aspects of the present disclosure. The wireless communications system 100 may include one or more access nodes 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The access nodes 105 may be dispersed throughout a geographic area to form the wireless communications system 100 and may be devices in different forms or having different capabilities. The access nodes 105 and the UEs 115 may wirelessly communicate via one or more communication links 125. Each access node 105 may provide a coverage area 110 over which the UEs 115 and the access node 105 may establish one or more communication links 125. The coverage area 110 may be an example of a geographic area over which an access node 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the access nodes 105, or network equipment (e.g., core network nodes, relay devices, integrated access and backhaul (IAB) nodes, or other network equipment), as shown in FIG. 1.

The access nodes 105 may communicate with the core network 130, or with one another, or both. For example, the access nodes 105 may interface with the core network 130 through one or more backhaul links 120 (e.g., via an S1, N2, N3, or other interface). The access nodes 105 may communicate with one another over the backhaul links 120 (e.g., via an X2, Xn, or other interface) either directly (e.g., directly between access nodes 105), or indirectly (e.g., via core network 130), or both. In some examples, the backhaul links 120 may be or include one or more wireless links.

One or more of the access nodes 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the access nodes 105 and the network equipment including macro eNBs or gNBs, small cell eNBs or gNBs, or relay base stations, among other examples, as shown in FIG. 1.

The UEs 115 and the access nodes 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to an access node 105, or downlink transmissions from an access node 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the access nodes 105, the UEs 115, or both) may have hardware configurations that support communications over a particular carrier bandwidth or may be configurable to support communications over one of a set of carrier bandwidths. In some examples, the wireless communications system 100 may include access nodes 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the access nodes 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported s spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each access node 105 may provide communication coverage via one or more cells, for example a macro cell, a small cell, a hot spot, or other types of cells, or any combination thereof. The term "cell" may refer to a logical communication entity used for communication with an access node 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the access node 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered access node 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). An access node 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, an access node 105 may be movable and therefore provide communication coverage for a moving geographic coverage area 110. In some examples, different geographic coverage areas 110 associated with different technologies may overlap, but the different geographic coverage areas 110 may be supported by the same access node 105. In other examples, the overlapping geographic coverage areas 110 associated with different technologies may be supported by different access nodes 105. The wireless communications system 100 may include, for example, a heterogeneous network in which different types of the access nodes 105 provide coverage for various geographic coverage areas 110 using the same or different radio access technologies.

The wireless communications system 100 may support synchronous or asynchronous operation. For synchronous operation, the access nodes 105 may have similar frame timings, and transmissions from different access nodes 105 may be approximately aligned in time. For asynchronous operation, the access nodes 105 may have different frame timings, and transmissions from different access nodes 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or an access node 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of an access node 105. Other UEs 115 in such a group may be outside the geographic coverage area 110 of an access node 105 or be otherwise unable to receive transmissions from an access node 105. In some examples, groups of the UEs 115 communicating via D2D communications may utilize a one-to-many (1:M) system in which each UE 115 transmits to every other UE 115 in the group. In some examples, an access node 105 facilitates the scheduling of resources for D2D communications. In other cases, D2D communications are carried out between the UEs 115 without the involvement of an access node 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., access nodes 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the access nodes 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as an access node 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or access node 105 may be distributed across various network devices (e.g., radio heads and ANCs) or consolidated into a single network device (e.g., an access node 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the access nodes 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the access nodes 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

An access node 105 or a UE 115 may be equipped with multiple antennas, which may be used to employ techniques such as transmit diversity, receive diversity, multiple-input multiple-output (MIMO) communications, or beamforming. The antennas of an access node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with an access node 105 may be located in diverse geographic locations. An access node 105 may have an antenna array with a number of rows and columns of antenna ports that the access node 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The access nodes 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a access node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

An access node 105 or a UE 115 may use beam sweeping techniques as part of beam forming operations. For example, an access node 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by an access node 105 multiple times in different directions. For example, the access node 105 may transmit a signal according to different beamforming weight sets associated with different directions of transmission. Transmissions in different beam directions may be used to identify (e.g., by a transmitting device, such as an access node 105, or by a receiving device, such as a UE 115) a beam direction for later transmission or reception by the access node 105.

Some signals, such as data signals associated with a particular receiving device, may be transmitted by an access node 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the access node 105 in different directions and may report to the access node 105 an indication of the signal that the UE 115 received with a highest signal quality or an otherwise acceptable signal quality.

In some examples, transmissions by a device (e.g., by an access node 105 or a UE 115) may be performed using multiple beam directions, and the device may use a combination of digital precoding or radio frequency beamforming to generate a combined beam for transmission (e.g., from an access node 105 to a UE 115). The UE 115 may report feedback that indicates precoding weights for one or more beam directions, and the feedback may correspond to a configured number of beams across a system bandwidth or one or more sub-bands. The access node 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a access node 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the access node 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and an access node 105 or a core network 130 supporting radio bearers for user plane data. At the physical layer, transport channels may be mapped to physical channels.

The UEs 115 and the access nodes 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Access nodes 105 may support the functionality for an IAB network operation. For example, the access nodes 105 may be split into one or more support entities (e.g., functionalities) for promoting wireless backhaul density in collaboration with NR communication access (e.g., via mmW technologies). In some examples, an access node 105 (e.g., a donor access node or donor IAB node) may be split into associated central unit (CU) and distributed unit (DU) entities in which one or more DUs may be partially controlled by an associated CU. The CU entity of the access node 105 may facilitate connection between the core network 130 and the access node 105 (e.g., an access node), for example, via a wireline connection or a wireless connection to the core network 130. The CU entity of the access node 105 may hold RRC and PDCP layer functions (e.g., for facilitating connections with the core network 130). The one or more DUs of the access node 105 may control or schedule functionality for one or more additional devices (e.g., one or more additional access nodes 105 or the UEs 115) according to configured access and backhaul links. The one or more DUs of the access node 105 may hold RLC, MAC, and physical (PHY) layer functions (e.g., to schedule one or more additional devices). Based on the supported CU and DU entities at an access node 105, such an access node 105 may be referred to as a donor access node (e.g., an IAB donor or donor node).

Additionally, in some examples, an access node 105 may be split into associated MT and DU entities, where the MT functionality of the access node 105 may be controlled or scheduled by a DU entity of one or more other access nodes 105 (e.g., via a Uu interface). The DUs associated with such an access node 105 may be controlled by MT functionality (e.g., by commands received via the MT functionality). In addition, the DUs of the access node 105 may be at least partially controlled by signaling messages from the CU entities of an associated donor access node (e.g., a donor node) on the configured access and backhaul links of a network connection (e.g., via an F1-application protocol (AP)). The DUs of one or more access nodes 105 may support one of multiple serving cells of a network coverage area. The DUs of the one or more access nodes 105 may control or schedule functionality for additional devices (e.g., one or more of the additional access nodes 105 or the UEs 115) according to the configured access and backhaul links. Based on supported MT and DU entities at an access node 105, the access node 105 may be referred to as an intermediate access node (e.g., an IAB node or an IAB relay node).

As described herein, in wireless communications system 100, one or more access nodes 105 (e.g., donor access nodes or donor IAB nodes) may include one or more CUs and one or more DUs, in which one or more DUs associated with a donor access node may be partially controlled by a CU associated with the donor access node. A CU may be a component of a network management function, a database, a data center, or a core network 130 (e.g., a 5G NR core network (5GC)). A CU may communicate with the core network 130 via a backhaul link 132 (e.g., a wireline backhaul, or a wireless backhaul). In IAB networks, a CU (e.g., a donor access node 105) may communicate with the core network 130 (e.g., the 5GC) via a backhaul link 132 (e.g., a wireline backhaul, or wireless backhaul). The donor access node 105 may be referred to, for example, in an IAB network, as an IAB donor and may be in communication with one or more IAB nodes (e.g., other access nodes 105) operating as one or more DUs relative to the IAB donor and one or more UEs 115.

For example, an IAB network may include a chain of wireless devices starting with a donor access node 105 (e.g., a radio access network (RAN) node that terminates an interface with the core network) and ending with a UE 115, with any number of relay nodes in between. Intermediate or relay access nodes (e.g., intermediate access nodes, parent access nodes, child access nodes, IAB nodes, relay access nodes, relay nodes) may support MT functionality controlled and scheduled by an IAB donor, or another parent access node, such as a parent access node. Such access nodes may also support DU functionality relative to one or more additional entities (e.g., IAB nodes and UEs 115) within the relay chain or configuration of the access network (e.g., downstream). In some examples, MT functionality may refer to an implementation that supports at least some aspects of an MT or a UE 115. These relay mechanisms may forward traffic along to the additional entities, extend the range of wireless access for one or more access nodes 105, or enhance the density of backhaul capability within serving cells.

In some examples, wireless communications system 100 may employ one or more wired and wireless backhaul links for establishing connectivity between a core network (e.g., the core network 130) and the one or more wireless nodes within the wireless communications system 100. For example, the wireless communications system 100 may include multiple access nodes 105 (such as access nodes or remote radio heads), in which at least one access node 105 is coupled with a wireline backhaul link, such as an optical fiber cable. Additional access nodes 105 may not be directly coupled with the core network 130 or to another access nodes 105 via a wired backhaul link, and may use wireless backhaul links to communicate backhaul traffic. In such cases, the access nodes 105 may wirelessly communicate backhaul access traffic to a high-capacity fiber point (e.g., as a location in which an access node is coupled with a wireline link to core network 130). A backhaul link (e.g., a wireline link) may carry packets from the one or more established PDN gateways through an interface and subsequently direct the packets through the core network and to the coupled wireless nodes over the interface.

A mobile access node 105 (e.g., a mobile IAB node) may move within a network (e.g., an IAB network), such that a location of the mobile access node 105 may change with time. In some cases, the mobile access node 105 may come within a defined proximity of a cell (e.g., defined by a coverage area 110 of another network node (e.g., an access node 105, a base station, gNB, etc.), such that their respective coverage areas may completely or partially overlap, causing interference between downlink or uplink communications associated with the two access nodes 105. In some cases, the interference may not affect communications with the connected child nodes, but if one or more child nodes of the mobile access node 105 may be served by the second access node 105, the mobile access node 105 may be redundant.

To reduce interference and/or save power, a first access node 105 may reduce a coverage area 110 based on detection of a cell corresponding to a second access node 105 within a defined proximity. The second access node 105 may be detected based on one or more measurements corresponding to the cell of the first access node 105. Upon detection, the mobile access node 105 or a CU access node 105 may determine (e.g., based on one or more configuration parameters) whether the first or second access node is to adjust a coverage area 110 (e.g., by adjusting one or more cell parameters) and may indicate the determination to the other access node 105. An access node 105 may adjust cell parameters (e.g., reduce transmission power in the cell) to reduce the coverage area 110 if it is determined that the second access node 105 is within a defined proximity and/or if one or more other thresholds are exceeded. An access node 105 may adjust cell parameters to increase the coverage area 110 (e.g., increase transmission power in the cell) if it is determined that no other access nodes 105 are within a defined proximity and/or if one or more other parameters are not exceeded. Configuration parameters (e.g., one or more triggering conditions or thresholds) for triggering and/or completing coverage area adjustment may be configured by control signaling from the CU.

Figure 2:
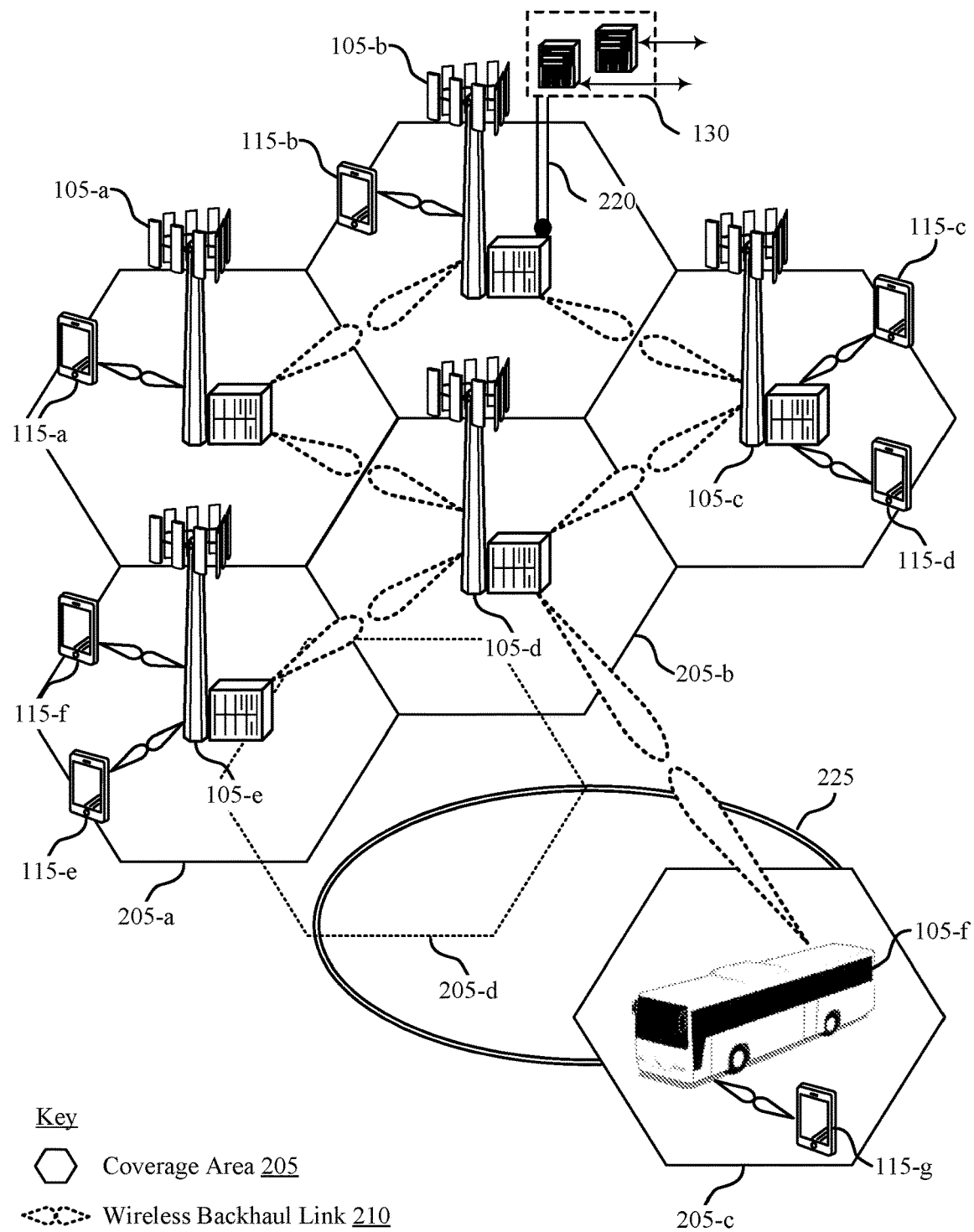
FIG. 2 illustrates an example of an IAB network that supports IAB node cell coverage adjustment in accordance with aspects of the present disclosure.

FIG. 2 illustrates an example of an IAB network 200 that supports IAB node cell coverage adjustment in accordance with aspects of the present disclosure. In some examples, IAB network 200 may implement aspects of wireless communication system 100. For example, IAB network 200 may include one or more UEs 115 and one or more access nodes 105, which may be examples of UEs 115 and access nodes 105 described with reference to FIG. 1. One or more of the access nodes 105 (e.g., access node 105-*b*, which may include a CU entity) may be connected to a core network 130 via a wireline backhaul connection 220. Infrastructure and spectral resources for network access within the IAB network 200 may additionally support one or more wireless backhaul links 210 between the access nodes 105. For example, the wireless backhaul links 210 may support an IAB network architecture, with the access nodes 105 serving as IAB nodes.

Access nodes 105 may communicate with other access nodes via one or more wireless backhaul links 210 and may communicate with UEs 115 (e.g., within a corresponding coverage area 205 of an access node) via one or more wireless access links 215. As described with reference to FIG. 1, an access node 105 may receive data or control information via the one or more wireless backhaul links 210 and may forward the data or the control information to a child access node 105 (e.g., via one or more wireless backhaul links 210) or to a UE 115 (e.g., via one or more wireless access links 215).

In some cases, IAB network 200 may represent a mobile IAB network, in which one or more access nodes 105 (e.g., IAB nodes) may move, or change a physical location, within the network. An IAB node that moves within the network may be referred to as a mobile IAB node, and a mobile IAB network may include both stationary and mobile IAB nodes. Examples of a mobile IAB node may include an IAB node installed on a bus, train, or taxi, among other examples. A mobile IAB node may support communications with one or more child UEs 115 via one or more wireless access links 215. In some cases, a mobile IAB node may additionally support communications with one or more child IAB nodes via one or more wireless backhaul links 210. In some other cases, a mobile IAB node may be unable to support communications with a child IAB node (e.g., due to its mobility features) and may therefore be a "leaf" network node, or a last-hop IAB node (e.g., may support access communications with one or more child UEs 115 and no other child nodes).

In one example, access node 105-$f$ may represent a mobile IAB node installed on a bus or other transportation system. Access node 105-$f$ may traverse a path 225 (e.g., a route) within the network (e.g., may move within the network), such that a location of access node 105-$f$ may change over time. Access node 105-$f$ may have a coverage area 205-$c$, which may support communications with one or more UEs 115 (e.g., UEs 115 on board access node 105-$f$ or within coverage area 205-$c$), such as UE 115-$g$. In some cases, access node 105-$f$ may additionally support communications with other access nodes 105 within or adjacent to coverage area 205-$c$.

As a mobile IAB node moves around within the network, the mobile IAB node may be assigned a new parent node based on a current location, where changing a parent node may be achieved through a topology adaptation procedure (e.g., performed according to a wireless communications standard). In some cases, the topology adaptation procedure may be directed to a CU unit (e.g., associated with access node 105-$b$) of the IAB network. In one example, access node 105-$d$ may be a parent node to access node 105-$f$, but as access node 105-$f$ traverses path 225, access node 105-$f$ may change to another parent node (e.g., access node 105-$c$ or 105-$e$) as directed by the CU (e.g., access node 105-$b$).

In some cases, a mobile IAB node may come within a defined proximity of a second node (e.g., a stationary or a mobile IAB node or other network node), such that if both the mobile IAB node and the second node transmit with full power (e.g., or above a threshold power) their respective coverage areas 205 may overlap (e.g., completely or partially overlap). For example, access node 105-$f$ may traverse one or more locations on path 225 where coverage area 205-$c$ may additionally be represented by coverage area 205-$d$, which may overlap with coverage area 205-$a$ and/or coverage area 205-$b$ (e.g., overlap with all or a portion of coverage areas 205-$a$ and/or 205-$b$). In some overlapping coverage areas 205, interference may occur between communications (e.g., downlink or uplink) associated with the mobile IAB node (e.g., access node 105-$f$) and with the second node (e.g., access node 105-$d$ and/or access node 105-$e$).

In some cases, connected child nodes (e.g., UEs 115 and/or other access nodes 105) of one or both IAB nodes may experience at least some radio link failure due to interference. In some cases, the interference may not affect communications with the connected child nodes. However, if one or more child nodes (e.g., UE 115-$g$) of the mobile IAB node (e.g., access node 105-$f$) may be served by the second IAB node (e.g., access node 105-$d$ or 105-$e$), the mobile IAB node may be redundant.

Accordingly, to reduce interference and/or save power, an IAB node (e.g., the access node 105-$f$, access node 105-$d$, or access node 105-$e$) may adjust a coverage area based on detection of a second IAB node (e.g., stationary node or mobile node) within a defined proximity. In some cases, the adjustment in coverage area may consume less power than before the adjustment. An IAB node may perform the adjustment by reducing the coverage area (e.g., reducing a maximum transmit power or reducing power in one or more directions) if it is determined that a second IAB node is within a defined proximity or if one or more threshold parameters are exceeded. An IAB node may increase the coverage area (e.g., increase a maximum power or increase power in one or more directions) or keep a coverage area constant if it is determined that no other IAB nodes are within a defined proximity or if one or more threshold parameters are not exceeded. The detection (e.g., of a cell of the second access node 105) may be made by either the IAB node (e.g., based on an MT signal measurement or DU measurement) or by a network CU (e.g., based on measurement reports).

A determination to adjust one or more parameters corresponding to the coverage area of an IAB node may be made at the IAB node and indicated to the CU, or may be made at the CU and indicated to the IAB node. In some cases, the mobile IAB node may change coverage area based on one or more other configured parameters, in addition to detecting the second IAB node, such as detecting interference (e.g., interference above a threshold) based on a high BLER (relative to a threshold) or low CQI report (relative to a threshold) from a child IAB node. That is, the IAB node may detect the cell of the second IAB node, but wait to adjust until interference is detected. If it is determined that a coverage area of an IAB node is to be reduced, then a set of its connected child nodes may be handed over (e.g., via a CU) to another parent IAB node.

In some cases, a CU (e.g., associated with access node 105-$b$) may receive measurement reports from various IAB nodes (e.g., access nodes 105) and determine to adjust the coverage area of one or more of the IAB nodes. The CU may receive the reports via control signaling and utilize control signaling to configure access node 105-$f$ (e.g., among other access nodes 105) with one or more cell coverage adjustment parameters. At one or more locations along path 225, coverage area 205-$c$ of access node 105-$f$ may overlap with one or more other coverage areas 205 (e.g., coverage area 205-$d$ may overlap with coverage areas 205-$a$ and/or 205-$b$). At the one or more locations, access node 105-$f$ or the CU may use one or more measurements to detect that a cell of another access node 105 (e.g., access node 105-$d$ or 105-$e$) is within a defined proximity. Similarly, access node 105-$f$ or the CU may use one or more measurements (e.g., received measurement or cell quality reports) to determine that access node 105-$f$ is to adjust the cell coverage. The device that performs the determining may notify the other device (e.g., the CU or access node 105-*f*) of the determination using one or more signaling techniques. The CU may initiate a handover procedure to hand over a set of child devices (e.g., UE 115-*g*) from access node 105-*f* to one or more other access nodes 105 (e.g., access node 105-*d* or 105-*e*). Access node 105-*f* may notify a set of its child devices of the handover procedures, may perform the handover procedure, and may adjust its cell coverage. By turning off, access node 105-*f* may lower an amount of interference experienced by one or more UEs 115 or other access nodes 105, or may save power, among other benefits.

In some cases, access node 105-*f* may continue following path 225, such that coverage area 205-*c* does not overlap with other coverage areas 205. Access node 105-*f* or the CU may determine (e.g., based on one or more measurements) that no other access nodes are within a defined proximity of access node 105-*f* and may determine (e.g., based on one or more measurements) that access node 105-*f* may increase its coverage area. The device that performs the determining may notify the other device (e.g., the CU or access node 105-*f*) of the determination, and access node 105-*f* may increase its coverage area. The CU may initiate a handover procedure to hand over child devices (e.g., new child devices and/or previous child devices, such as UE 115-*g*) from one or more other access nodes 105 (e.g., access node 105-*d* or 105-*e*) to access node 105-*f*, and the corresponding devices may perform the handover procedure.

Figure 3:
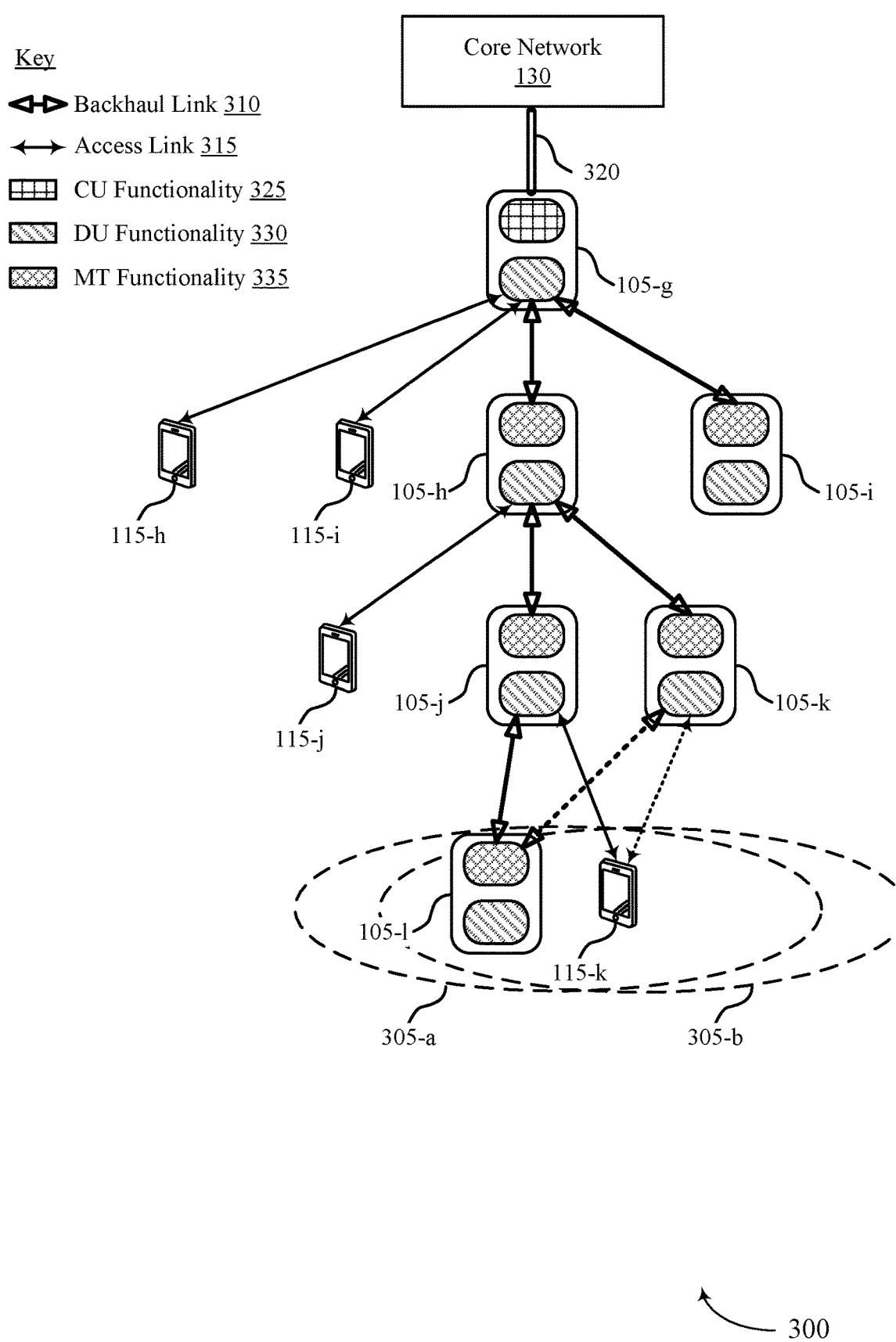
FIG. 3 illustrates an example of an IAB network that supports IAB node cell coverage adjustment in accordance with aspects of the present disclosure.

FIG. 3 illustrates an example of an IAB network 300 that supports IAB node cell coverage adjustment in accordance with aspects of the present disclosure. In some examples, IAB network 300 may implement aspects of wireless communication system 100. For example, IAB network 300 may include one or more access nodes 105, which may be mobile (e.g., may move, or change location) within the network and where one or more access nodes 105 may be stationary.

IAB network 300 may include a donor access node 105-*g* (such as a donor IAB node or donor base station) split into an associated CU 325 functionality and an associated DU 330 functionality. The DU 330 associated with the donor access node 105-*g* may be partially controlled by the CU 325 of the access node 105-*g*. In some examples, the CU 325 and the DU 330 may be located within a single device. In other examples, the DU 330 of the donor access node 105-*g* may be externally located, and may be in wired or wireless communication with the CU 325. The CU 325 of the donor access node 105-*g* may communicate with the core network 130 over a backhaul connection 320, for example, an NG interface (which may be an example of a portion of a backhaul link). A DU 330 of donor access node 105-*g* (e.g., of an IAB network) may support network coverage according to connections associated with backhaul links 310 and access links 315 of the IAB network. The DU 330 of the donor access node 105-*g* may control one or more of the access links 315 and the backhaul links 310 within the corresponding network coverage and provide controlling and scheduling for child devices such as relay access nodes 105 (e.g., IAB nodes) or UEs 115.

Each remaining access node 105 may be split into associated MT 335 and DU 330 functionalities (e.g., entities). The MT 335 of each access node 105 may be controlled or scheduled by one or more antecedent (e.g., parent) access nodes 105 (e.g., parent IAB nodes). For example, an access node 105 may be controlled or scheduled by donor access node 105-*g*, or another upstream access node 105. A DU 330 of an access node 105 may be partially controlled by signaling messages from the CU 325 of the associated donor access node 105-*g* (e.g., or additional CUs 325) of the network connection (e.g., via an F1-AP interface). The DU 330 may schedule one or more of the child access nodes 105 or UEs 115, and may control one or more of the access links 315 or the backhaul links 310 under its coverage.

An MT 235 of an access node 105 may act as or serve as a scheduled node (e.g., similar to a UE 115) scheduled by its parent access node (e.g., access node 105-*h* may be scheduled by access node 105-*g*). The DU 330 of the access node 105 may act as or serve as a scheduling node that schedules child devices of the access node 105 (such as a UE 115 or a child access node 105). The DU 230 of the donor access node 105-*g* may also schedule child IAB nodes downstream in the relay chain (such as an access node 105-1). An access node 105 operating as an IAB access node may relay communications between an access node 105 operating as a parent access node (e.g., an IAB donor or an IAB node upstream or higher on the relay chain) and an access node 105 operating as a child access node (e.g., an IAB node downstream or lower on the relay chain) or a UE 115. The mobile IAB network may share resources between access links 315 and backhaul links 310, and may reuse aspects of access network frameworks.

Access node 105-*j* may represent a mobile IAB node that may move within the network. Access node 105-*j* may serve an access node 105-1 and a UE 115-*k* (e.g., as child nodes) within a coverage area 305-*a*. A second access node 105-*k* (e.g., a stationary node) may have a second coverage area 305-*b*. In some cases, as described with reference to FIG. 2, access node 105-*j* may move such that coverage area 305-*a* overlaps with one or more other coverage areas 305 of one or more other access nodes 105. For example, coverage area 305-*a* may partially or fully overlap with coverage area 305-*b* at one or more locations of access node 105-*j*. The coverage areas 305 may correspond to cells of the respective IAB nodes (e.g., access nodes 105).

In some cases, the CU 325 may receive measurement reports for various IAB nodes (e.g., access nodes 105) and determine to adjust the coverage area of one or more IAB nodes based on one or more nodes being with a geographic proximity of each other (e.g., such as to cause cells or coverage areas 305 to overlap/interfere). For example, the CU 325 may receive measurement reports (e.g., reference signal measurements and/or cell quality measurements) from access node 105-*j* that indicates that some other cell (e.g., coverage area 305-*b*) is within a geographic proximity. In some cases, the determinization may be made by comparing one or more measurement report metrics to a threshold. For example, if a measurement is above a threshold, then the CU 325 may determine that the two access nodes 105-*j* and 105-*k* are within a geographic proximity. Alternatively, if the measurement is below the threshold, then the CU may determine that the two access nodes 105-*j* and 105-*k* are not within a geographic proximity. If the CU 325 determines that the nodes are within the geographic proximity, the CU 325 may signal either the first access node 105-*j* or the second access node 105-*k* to adjust the coverage area. The signal may include various cell parameters to adjust (e.g., transmission power). The signal may be an RRC signal, an F1-AP signal, MAC CE signal, or a combination thereof. The CU 325 may be configured with or may determine one or more parameters associated with adjusting the coverage area for access nodes 105 that are attached or associated with the CU 325.

Additionally or alternatively, one of the access nodes 105-*j* or 105-*k* may determine to adjust the cell coverage based on one or more measurements. In some cases, the access nodes 105-*j* or 105-*k* may receive one or more configuration parameters for triggering adjustment of the cell coverage (e.g., via F1-AP messaging or RRC signaling). For example, a MT element 335 of the access node 105-*j* (e.g., IAB node) may measure a link between the access node 105-*j* and its parent access node (e.g., access node 105-*h*). The measurement may include measuring a reference signal transmitted by the parent access node 105-*j* such as a channel state information reference signal (CSI-RS), a demodulation reference signal (DRMS) (e.g., of a PDSCH), one or more synchronization signals of a synchronization signal block (SSB), etc. The MT element 335 of the access node 105-*j* may also perform radio resource management (RRM) measurements for potential handover candidates (e.g., for child access nodes 105 or UEs 115), or measurements for inter-relay discovery, which may also be the basis for determining cell parameter adjustments. In some examples, the DU 330 of the access node 105-*j* may perform one or more measurements of a child link between the access node 105-*j* and one or more child nodes, and these measurements may be the basis for a cell coverage adjustment. The child link measurements may include sounding reference signal (SRS) measurement, demodulation reference signal (DMRS) (e.g., transmitted in a PUSCH) measurements, or a combination thereof. In some cases, the access node 105-*j* may receive channel quality reports (e.g., CQI) from its child node(s) as the measurement, and determine cell coverage adjustments based on these reports. As noted here, rather than making the adjustment determination itself, the access node 105-*j* may report these measurements to the CU 325, and the CU 325 may determine to adjust the coverage area (e.g., of the access node 105-*j* or another IAB node such as access node 105-*k*).

In some examples, the access node 105-*j* may determine a geographic proximity of another node based on measurements corresponding to the other node. For example, the access node 105-*j* may measure a signal strength of the access node 105-*k* (e.g., RSRP, reference signal received quality (RSRQ), signal to interference plus noise ratio (SINR), RSSI, CQI, et.) and determine to adjust the cell coverage based on the signal strength. These signal strength measurements may also be reported to the CU 325, such that the CU 325 may make a cell adjustment determination.

In some cases, the second access node 105 may be considered detected within a defined proximity of access node 105-*j* if a measured signal strength or an interference level (e.g., measured by access node 105-*j* or a child node) of the second access node 105 exceeds the respective configured threshold. If the measured signal strength or interference level is less than or equal to the respective configured threshold, the second access node may be undetected or outside the defined proximity. An interference level can be estimated based on a measured strength of an interference signal (e.g., from the second access node 105). Additionally or alternatively, the interference level may be estimated by a quality metric for communications with a child node of access node 105-*j*, such as one or more of a block error rate (BLER), a channel quality indicator (CQI), or an SINR, among other examples. For example, a low SINR or CQI, or a high BLER, may indicate that access node 105-*j* experiences interference from the second access node 105. The access node 105-*j*, the CU 325, and/or another access node 105 may compare the signal strength or inter-reference level to the threshold to determine geographic proximity.

The access nodes 105 (e.g., first access node 105-*j*) may perform various operations to support the cell coverage adjustments. In one example, an access node 105 (e.g., that determines that it needs to adjust the cell coverage or that is selected for adjustment by CU 325) may adjust the maximum transmission power. For example, if the maximum transmission power is reduced, then the corresponding coverage area 305 may be reduced. Similar, an access node 105 may also change the maximum supported round trip time (RTT). In such cases, the access node 105 may change the random access channel (RACH) configuration to change the RTT.

In some cases, the access node 105 may adjust the cell coverage in some spatial directions. For example, the access node 105 may apply different transmit powers on different synchronization signal blocks (SSBs) towards different spatial directions. In some examples, the access node 105 may not transmit SSBs on some spatial directions towards in an interfering neighbor access node 105 (or other network node). In these cases, the physical broadcast channel (PBCH) power broadcast in a system information block (SIB) message may include fields indicating directions/powers such as to be beam-direction specific. The one or more directions for adjustment may be based on the detected cell. For example, an SSB corresponding to a direction towards an interfering cell may be transmitted on with reduced power such that the coverage areas 305 (e.g., cells) do not overlap. Further, the access node 105 may allocate RACH occasions for one or more directions to adjust the cell coverage. The information in the SIB1 that includes the SSB may be updated to signal these directional adjustments. In some examples, the access node 105 may determine to stop service in all directions by entering a power saving mode or by entering a cell-barring mode (e.g., RACH requests are rejected).

In some cases, an access node 105 may select a rule or policy for managing power from a set of rules or policies, and the selection may be based on measurement information and a selection criterion. Such rules may be referred to as power management (PM) policies. The list of power management policies from which an access node 105 may choose can be specified (e.g., in a look up table, preconfigured, listed in a specification, etc.), configured by a CU (e.g., CU 325) via control signaling, or both.

A power management policy may be a formula for determining downlink or uplink maximum transmission power as a function of various measurement quantities (e.g., signal strength measurements, pathloss measurements, etc.). Additionally or alternatively, a power management policy may be a set of configured parameters for determining downlink or uplink power control. For example, parameters for downlink power control may include SSB-PBCH power and various energy per resource element (EPRE) power ratios between various downlink signals or channels. Parameters for uplink power control may include target received power, pathloss compensation factor, pathloss reference RS, or a step size for transmission power control (TPC) commands. One or more of these parameters (e.g., parameters for uplink or downlink power control) may have preconfigured values, and a set of preconfigured parameter values may correspond to a single power management policy.

The selection criterion that an access node 105 uses to select a power management policy may be specified (e.g., preconfigured, listed in a specification, etc.) or may be configured by a CU (e.g., CU 325) via control signaling, or both. For example, a power management policy may be selected based on a configured threshold or a range of one or more measurement quantities.

The measurement information that an access node 105 uses for power management policy selection may include signal strength measurements (e.g., RSRP, RSSI, RSRQ etc.), or pathloss measurements performed by an IAB-node on signals received from another IAB-node, or information reported from child nodes on channel quality or interference measurements, or some combination of these measurements.

If access node 105-*j* determines to adjust the cell coverage, access node 105-*j* may transmit an indication of the adjustment to the CU 325 (e.g., via one or more of an F1-AP interface, a MAC CE, an RRC message, or an Xn message configured for inter-CU coordinate on adjusting cell coverage). The indication may include one or more cell adjustment parameters (e.g., updated transmission power, updated physical random access channel (PRACH) configuration, updated information on transmitted SSB, a list of power management policies, selection criterions for power management policies, etc.). Additionally or alternatively, access node 105-*j* may transmit a request message to the CU 325 indicating a request to adjust cell coverage. If the CU 325 determines to change the cell coverage of access node 105-*j* (e.g., based on measurement reports or a request message), the CU 325 may transmit an adjustment indication to access node 105-*j* (e.g., via one or more of an F1-AP interface, a MAC CE, or an RRC message) indicating that the access node 105-*j* is to adjust. The message may include one or more cell adjustment parameters. After receiving or determining cell adjustment parameters, the access node 105-*j* may transmit the update cell parameters in a SIB message (e.g., via paging). After transmitting or receiving a cell adjustment indication, the CU 325 may initiate a handover procedure for child nodes of access node 105-*j* (e.g., UE 115-*k* and access node 105-1). In the case of reducing cell coverage, the handover procedure may transfer some of the child nodes to another access node 105 (e.g., access node 105-*k*), and in the case of increasing cell coverage, the handover procedure may transfer the child nodes to access node 105-*j*. In some cases, cell adjustment indication may further include one or more parameters, such as an action time for turning on or off, an identifier (ID) of a detected access node 105 (e.g., access node 105-*k*), a handover request (e.g., with a list of child nodes to handover).

In some cases, it may be determined (e.g., by access node 105-*k* or by the CU 325) that the child nodes are to be handed over to the detected, second access node 105 (e.g., access node 105-*k*). In such cases, the determination may be made without reference to a handover measurement report, and may in some cases be based on the determination that the second access node 105 is within a defined proximity of access node 105-*j*. In some other cases, a child node may be informed (e.g., via a SIB notification) of the upcoming cell coverage adjustment procedure, and the child node may search for a new parent node by performing one or more signal measurements. The child node may transmit a measurement report (e.g., based on the one or more signal measurements) to the CU 325 for handover to a parent access node 105, and the CU 325 may determine the new parent access node (e.g., the second access node 105 or a different access node 105) based on the measurement report. The child node may transmit the measurement report via a parent access node 105 (e.g., access node 105-*j*).

In some cases, two mobile access nodes 105 may be detected (e.g., may detect each other or may be detected by the CU 325) within a defined proximity of each other. For example, access node 105-*k* may also represent a mobile IAB node and access nodes 105-*j* and 105-*k* may be detected to be within a defined proximity of each other. In such cases, one of the access nodes 105 may be randomly selected to adjust cell coverage or may be selected to adjust cell coverage based on one or more factors. The CU 325, or one or both of the two mobile access nodes 105, may determine which access node 105 is to reduce coverage. In an example where the CU 325 makes the determination, the CU 325 may indicate to the selected access node 105 (e.g., access node 105-*j*) that the access node 105 is to reduce cell coverage. In an example where one or both of the two mobile access nodes 105 makes the determination, the two access nodes 105 may exchange signaling to determine and notify each other of which access node 105 is to adjust (e.g., via a MAC CE, or via an F1-AP message communicated via the CU 325).

An access node 105 may be selected to adjust coverage based on a number of child nodes, a mobility state, or an amount power consumption. One or more of these parameters may be communicated between the two access nodes 105 or may be communicated by both of the access nodes 105 to the CU 325 (e.g., in order to make the determination). In one example, an access node 105 with a lower number of connected child nodes (e.g., UEs 115 and other access nodes 105) may be selected to reduce coverage (e.g., such that a handover burden is less). In some cases, a mobile access node 105 with a higher mobility or with a higher power consumption may be selected, such that a more stable access node 105 or an access node 105 with more access to power may sustain the cell coverage. In another case, the access node 105 with the larger hop count to the donor IAB node may be selected for cell coverage reduction.

Figure 4:
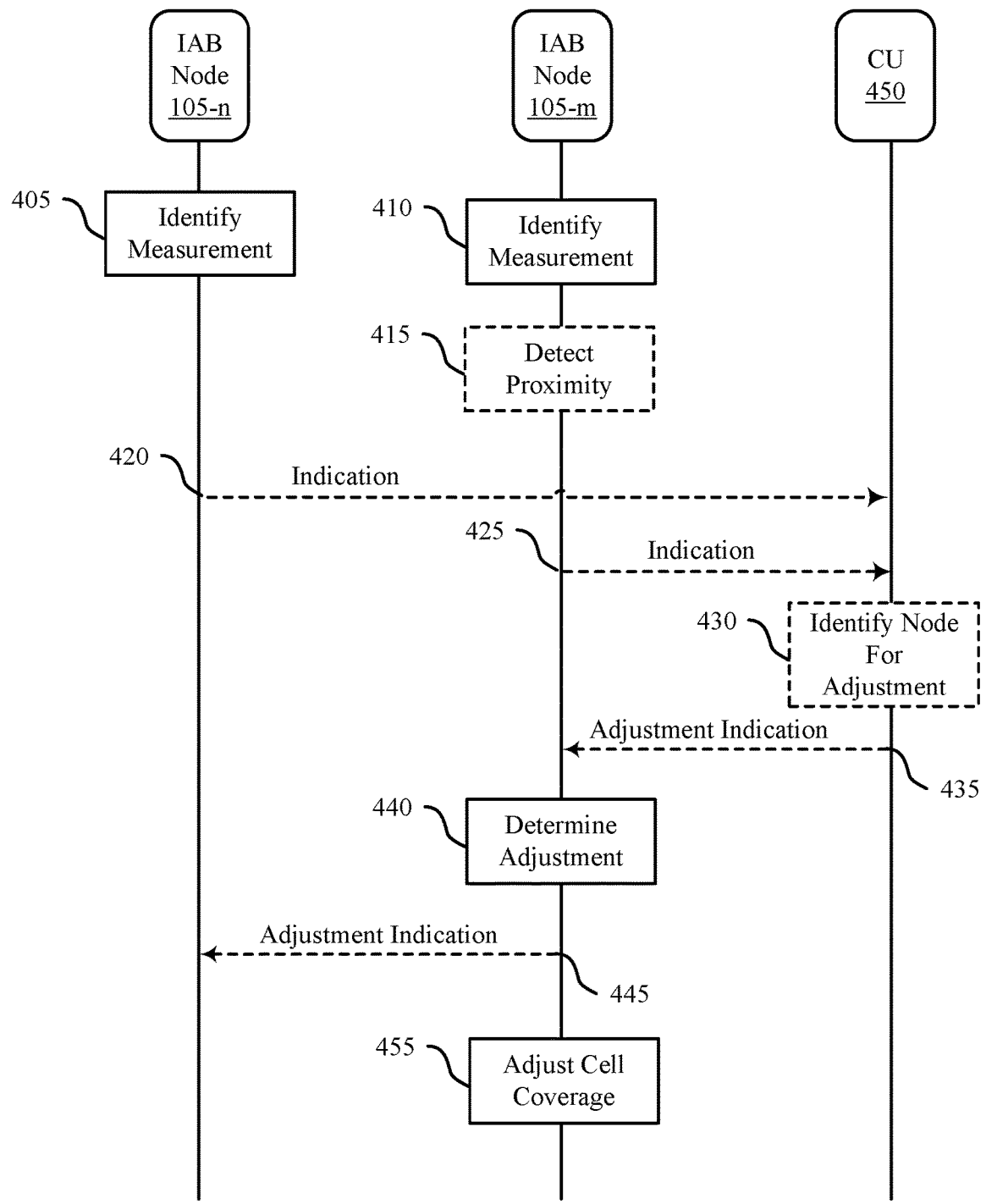
FIG. 4 illustrates an example of a process flow diagram that supports IAB node cell coverage adjustment in accordance with aspects of the present disclosure.

FIG. 4 illustrates an example of a process flow diagram 400 that supports IAB node cell coverage adjustment in accordance with aspects of the present disclosure. In some examples, process flow diagram 400 may implement aspects of wireless communication system 100. Features of process flow diagram 400 may be implemented by access nodes 105-*m* and 105-*n* and a CU 450, which may be examples of the devices as described with respect to FIGS. 1-3. CU 450 may be an example of a donor access node 105. Access nodes 105-*m* and 105-*n* may be controlled by the CU 450 and may form part of a mobile IAB network including additional access nodes 105. Access node 105-*m* and/or 105-*n* may be an example of a mobile IAB node (e.g., relay node), as described with reference to FIGS. 1-3. Access node 105-*m* may be an example of a first IAB node, and access node 105-*n* may be an example of a second IAB node.

At 405, access node 105-*n* (e.g., the second IAB node) may identify one or more measurements. Identifying the measurements may include performing measurements of reference signals transmitted by various devices within an IAB network or other wireless network nodes, including parent nodes, child nodes, UEs 115, etc. Identifying the measurements may also include receiving measurements from CU 450 and/or from child noes (e.g., signal quality reports). For example, an MT unit of the access node 105-*n* may measure various reference signals including one or more reference signals transmitted on an SSB, a CSI-RS, a PDSCH DMRS, etc. The MT unit's measurements may also include measurements for potential handover candidates or measurements for inter-relay discovery. The DU of access node 105-*n* may also perform the measurements on child node reference signals (e.g., SRS, PUSCH DMRS, etc.). In some examples, the identified/performed measurements may indicate that the cell of another node (e.g., IAB node 105-*m*) is interfering with communications in the cell supported by the access node 105-*n* or that the cell of the access node 105-*n* is interfering with communications in another node.

At 410, access node 105-*m* (e.g., the first IAB node) may identify one or more measurements. Identifying the measurements may include performing measurement of reference signals transmitted by various devices within an IAB network or other wireless network nodes, including parent nodes, child nodes, UEs 115, etc. Identifying the measurements may also include receiving measurements from CU 450 and/or from child noes (e.g., signal quality reports). For example, an MT unit of the access node 105-*m* may measure various reference signals including one or more reference signals transmitted on an SSB, a CSI-RS, a PDSCH DMRS, etc. The MT unit's measurements may also include measurements for potential handover candidates or measurements for inter-relay discovery. The DU of access node 105-*n* may also perform the measurements on child node reference signals (e.g., SRS, PUSCH DMRS, etc.). In some examples, the identified/performed measurements may indicate that the cell of another node (e.g., IAB node 105-*n*) is interfering with communications in the cell supported by the access node 105-*m* or that the cell of the access node 105-*n* is interfering with communications in another node.

At 415, access node 105-*m* (e.g., the first IAB node) may detect a geographic proximity of a cell relative to the first IAB node (e.g., the access node 105-*m*). The cell may correspond to the access node 105-*n*, which may be a child node of the access node 105-*m*, a parent node of the access node 105-*m*, anther IAB node, etc. In some cases, the cell corresponds to another wireless communication node (e.g., a NR gNB). The proximity may be based on a comparison of the identified measurement to a threshold. For example, reference signal measurements or signal quality measurements may indicate that the cell is interfering with the coverage area of the access node 105-*m*.

At 420, the access node 105-*n* may transmit an indication of the identified measurements to the CU 450. The indication may be in the form of F1-AP, RRC, or MAC CE signaling. At 425, the access node 105-*m* may transmit an indication of the identified measurements to the CU 450 and/or an indication of a geographic proximity of another cell relative to the coverage area of the access node 105-*m*. The indication may be in the form of F1-AP, RRC, or MAC CE signaling. In some cases, the indication corresponds to a request for a cell adjustment to the CU 450.

The CU 450 may receive the measurement and/or indication of a geographic proximity of a cell relative to the access node 105-*m*. In some cases, the CU 450 may identify that the cell is in geographic proximity based on received measurement reports (e.g., based on a comparison of the measurements to a threshold). At 430, the CU 450 may identify a node for a cell coverage adjustment based on the measurement and/or other factors. For example, the CU 450 may identify a node for cell adjustment based on a number of connected child nodes (e.g., the node with fewer child nodes may be selected for cell coverage adjustment), the mobility state (e.g., the higher mobility node may be selected for cell coverage adjustment), power consumption (e.g., the node with a higher power consumption may be selected for cell coverage adjustment), and/or hope count to the donor node (e.g., the node with a larger hop count to the donor may be selected for cell coverage adjustment).

At 435, the CU 450 may transmit an indication of an adjustment of at least one parameter corresponding to cell coverage based at least in part on receiving the indication of the geographic proximity. The adjustment indication may be in the form of a F1-AP signal, RRC signal, or MAC CE message. In some examples, the adjustment indication may include a list of power management policies, selection criterions for selecting a power management policies, or both.

At 440, the access node 105-*m* (e.g., the first IAB node) may determine an adjustment to at least one parameter corresponding to a cell coverage of the first IAB node based at least in part on a geographic proximity of a cell relative to the first IAB node. The determination may be based on the identified/received measurements or may be based on the adjustment indication received at 435 from the CU 450.

At 445, the access node 105-*m* may transmit an indication of the adjustment to the at least one parameter. For example, the access node 105-*m* may transmit the indication to one or more child access nodes 105, one or more parent access nodes 105, CU 450, and one or more other IAB nodes. The indication may also be transmitted to one or more UEs 115 served by or within range of the access node 105-*m*. The indication may be in the form of F1-AP signaling, RRC signaling, and/or MAC CE messaging. The indication may also be broadcast using SIB1 (e.g., paging), where adjustments corresponding to SSBs for one or more spatial directions may be indicated.

At 455, the access node 105-*m* may adjust the at least one parameter corresponding to the cell coverage of the first IAB node in accordance with the determining. The adjusting may include adjusting a maximum transmission power, adjusting transmission power in one or more spatial directions, etc. The access node 105-*m* may apply a different transmission powers on different SSB blocks towards different spatial directions. In some examples, the access node 105-*m* may cease transmission on SSBs in some spatial directions (e.g., towards an interfering neighbor IAB node such as access node 105-*n*). In some cases, the access node 105-*m* may enter a power saving mode and/or a cell-barring state (e.g., RACH requests may be denied). In some examples, the access node 105-*m* may select a power management policy from a list of power management policies based on measurement information and a selection criterion. In some examples, the access node 105-*m* and corresponding nodes may perform a handover procedure to handover UEs/nodes connected to the access node 105-*m* in accordance with the adjustment. In some cases, the target node for a handover may be the interfering node (e.g., access node 105-*n*). To perform the handover, the access node 105-*m* may transmit a handover request (e.g., via RRC and/or F1-AP signaling) to the CU 425 and/or may coordinate handover using MAC CE messaging with the target node. Further, the access node 105-*m* may indicate the handover to one or more child nodes, and the child nodes may identify serving nodes through various procedures.

Figure 5:
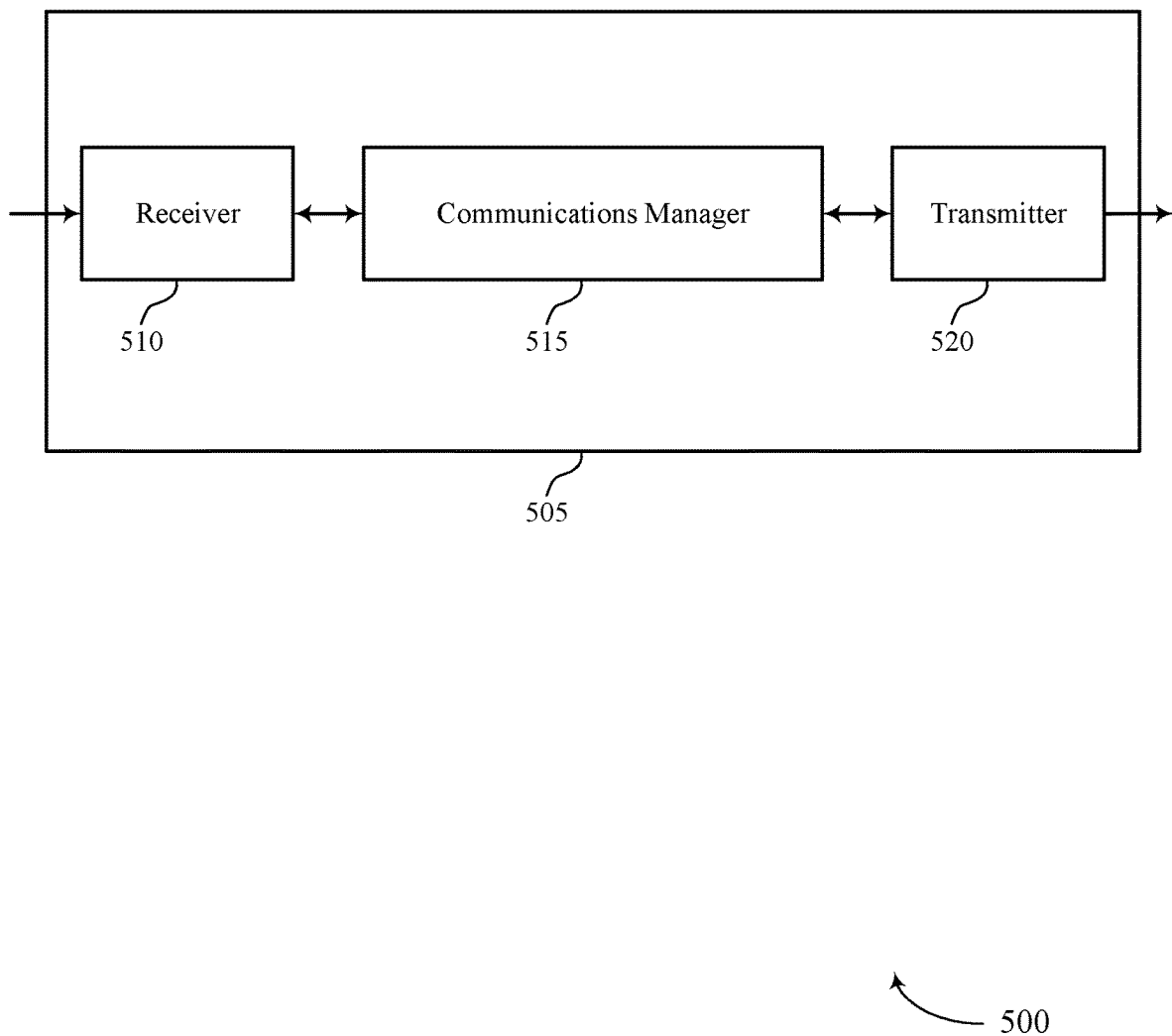
FIGS. 5 and 6 show block diagrams of devices that support IAB node cell coverage adjustment in accordance with aspects of the present disclosure.

FIG. 5 shows a block diagram 500 of a device 505 that supports IAB node cell coverage adjustment in accordance with aspects of the present disclosure. The device 505 may be an example of aspects of a UE 115 or access node 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to IAB node cell coverage adjustment, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may determine that a cell coverage of a first cell corresponding to the first relay node is in geographic proximity of a second cell, adjust at least one parameter corresponding to the cell coverage of the first cell of the first relay node based at least in part on the geographic proximity of the second cell and transmit information that indicates that the first relay node is adjusting the cell coverage. The communications manager 515 may also receive, from a first integrated access backhaul (IAB) node, an indication of a geographic proximity of a cell relative to the first IAB node and transmit an indication of an adjustment of at least one parameter corresponding to cell coverage based on receiving the indication of the geographic proximity. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

The actions performed by the communications manager 515 as described herein may be implemented to realize one or more potential advantages. For example, communications manager 515 may increase communication reliability and decrease interference at a UE 115 or at an access node 105 by reducing one or more interfering transmissions (e.g., from a different access node 105), which may reduce transmission delays and reduce retransmissions. Communications manager 515 may save power and increase battery life at a UE 115 or an access node 105 by reducing transmission delays and retransmissions. Similarly, communications manager 515 may save power at an access node 105 by determining to reduce cell coverage of an access node 105.

Figure 6:
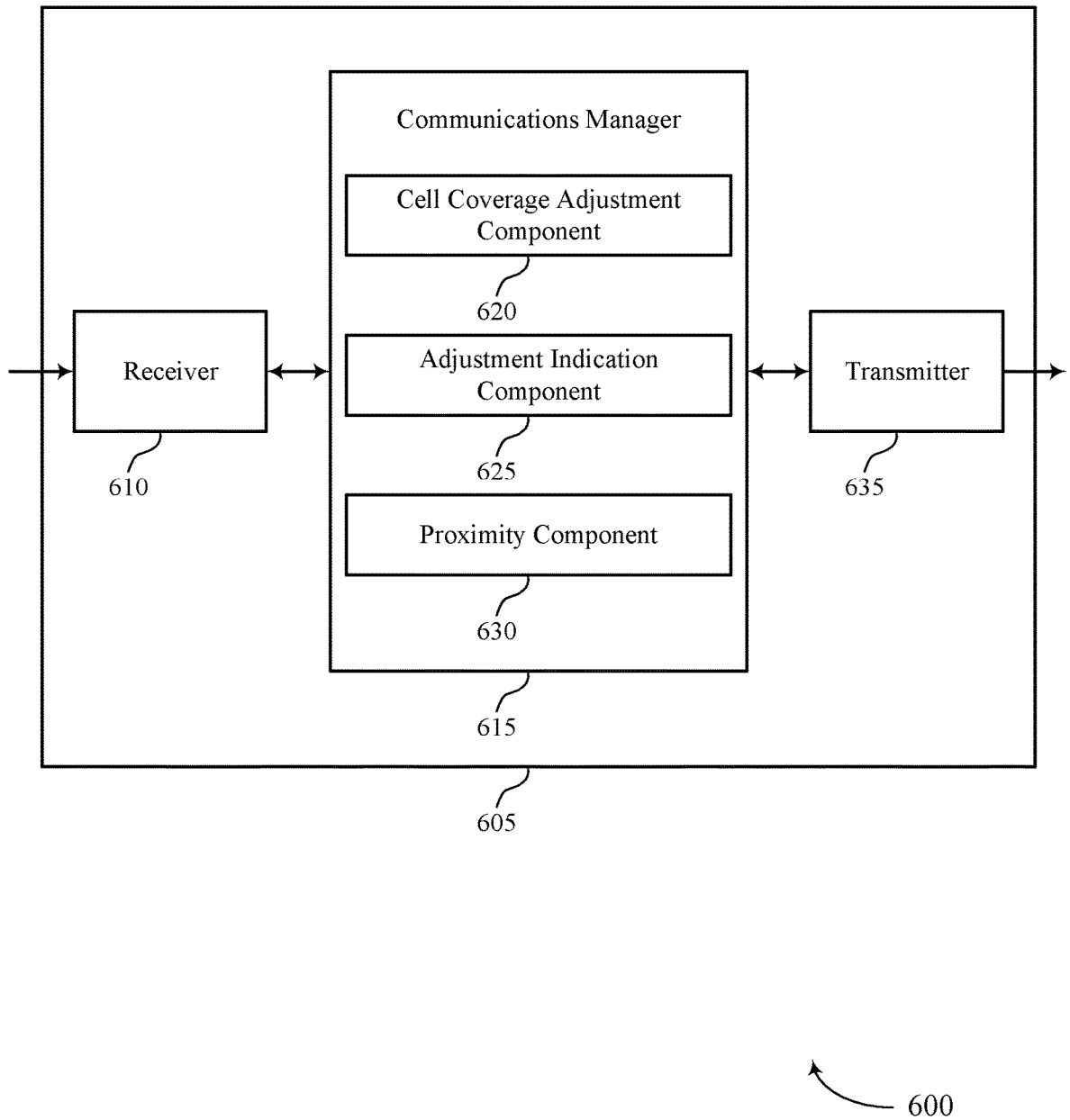

FIG. 6 shows a block diagram 600 of a device 605 that supports IAB node cell coverage adjustment in accordance with aspects of the present disclosure. The device 605 may be an example of aspects of a device 505, a UE 115, or an access node 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to IAB node cell coverage adjustment, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a cell coverage adjustment component 620, an adjustment indication component 625, and a proximity component 630. The communications manager 615 may be an example of aspects of the communications manager 810 or 910 as described herein.

The proximity component 630 may determine that a cell coverage of a first cell corresponding to the first relay node is in geographic proximity of a second cell.

The cell coverage adjustment component 620 adjust at least one parameter corresponding to the cell coverage of the first cell of the first relay node based at least in part on the geographic proximity of the second cell.

The adjustment indication component 625 may transmit information that indicates that the first relay node is adjusting the cell coverage.

The proximity component 630 may receive, from a first integrated access backhaul (IAB) node, an indication of a geographic proximity of a cell relative to the first IAB node.

The adjustment indication component 625 may transmit an indication of an adjustment of at least one parameter corresponding to cell coverage based on receiving the indication of the geographic proximity.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
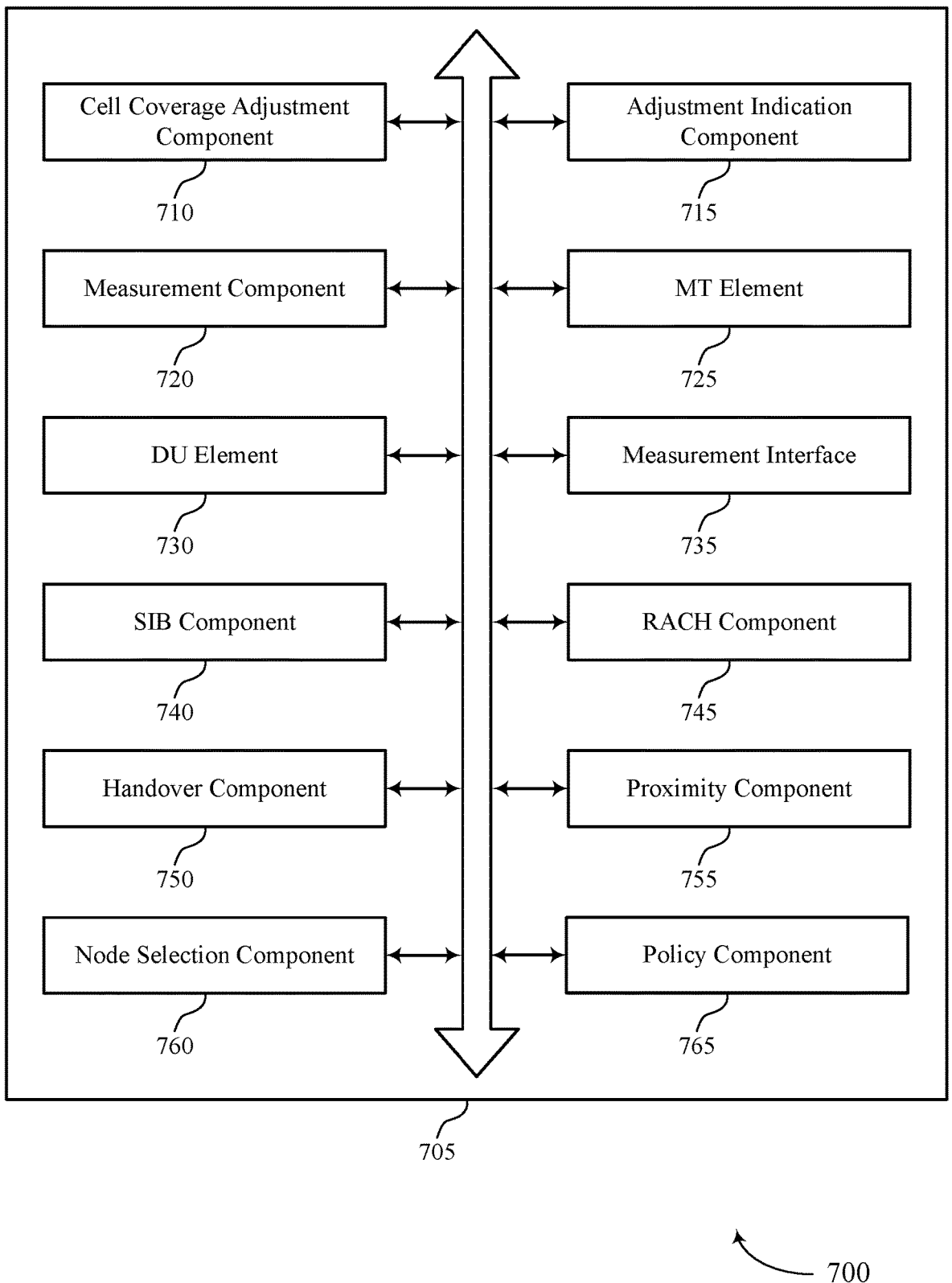
FIG. 7 shows a block diagram of a communications manager that supports IAB node cell coverage adjustment in accordance with aspects of the present disclosure.

FIG. 7 shows a block diagram 700 of a communications manager 705 that supports IAB node cell coverage adjustment in accordance with aspects of the present disclosure. The communications manager 705 may be an example of aspects of a communications manager 515, a communications manager 615, or a communications manager 810 described herein. The communications manager 705 may include a cell coverage adjustment component 710, an adjustment indication component 715, a measurement component 720, a MT element 725, a DU element 730, a measurement interface 735, a SIB component 740, a RACH component 745, a handover component 750, a proximity component 755, a node selection component 760, and a policy component 765. Each of these modules may communicate, directly or indirectly, with one another (e.g., via one or more buses).

The proximity component 755 may determine that a cell coverage of a first cell corresponding to the first relay node (e.g., first IAB node) is in geographic proximity of a second cell (e.g., corresponding to a second relay node).

The cell coverage adjustment component 710 may determine an adjustment to at least one parameter corresponding to a cell coverage of the first IAB node based on a geographic proximity of a cell relative to the first IAB node. In some examples, the cell coverage adjustment component 710 may adjust the at least one parameter corresponding to the cell coverage of the first IAB node in accordance with the determining. In some examples, the cell coverage adjustment component 710 may adjust a maximum transmission power, a random access channel configuration, or both.

In some examples, the cell coverage adjustment component 710 may adjust the cell coverage of the first IAB node in one or more spatial directions.

In some examples, the cell coverage adjustment component 710 may adjust the cell coverage of the first IAB node in one or more spatial directions in accordance with the determining by applying a first transmit power to a first synchronization signal block in a first direction and a second transmit power to a second synchronization signal block in a second direction based on the geographic proximity of the cell.

In some examples, the cell coverage adjustment component 710 may adjust the cell coverage of the first IAB node in one or more spatial directions in accordance with the determining by not transmitting on at least one synchronization signal block based on the geographic proximity of the cell. In some examples, the cell coverage adjustment component 710 may switch to a power saving mode in accordance with the adjusting.

In some cases, the cell corresponds to a second IAB node. In some cases, the second IAB node is a child IAB node of the first IAB node, a parent IAB node of the first IAB node, or another wireless network node.

The adjustment indication component 715 may transmit an indication of the adjustment to the at least one parameter. In some examples, the adjustment indication component 715 may transmit an indication of an adjustment of at least one parameter corresponding to cell coverage based on receiving the indication of the geographic proximity.

In some examples, the adjustment indication component 715 may transmit an indication of a maximum uplink power to one or more user equipments (UEs) served by the first IAB node in accordance with the adjusting.

In some examples, the adjustment indication component 715 may transmit an indication of the adjustment or a request for the adjustment to a central unit.

In some examples, the adjustment indication component 715 may receive, from a central unit, an indication of the adjustment of the at least on parameter, where the determining is performed in accordance with the indication of the adjustment. In some examples, the indication of the adjustment includes a list of power management policies, a selection criterion associated with power management policies or both.

In some examples, the adjustment indication component 715 may transmit, to the central unit, an indication of a measurement corresponding to the cell coverage, where the indication of the adjustment is received based at least in a part on transmitting the indication of the measurement.

In some examples, the adjustment indication component 715 may transmit the indication of the adjustment to the first IAB node, a second IAB node corresponding to the cell, or a combination thereof.

In some examples, the adjustment indication component 715 may transmit the indication to adjust the cell coverage in one or more spatial directions. In some examples, the adjustment indication component 715 may receive a request to adjust the at least one parameter from the first IAB node, where the indication of the adjustment is transmitted in accordance with the request.

In some examples, the adjustment indication component 715 may receive the indication via a F1 application protocol message or a radio resource control message. In some examples, the adjustment indication component 715 may transmit the indication via a F1 application protocol message or a radio resource control message.

In some cases, the indication of the adjustment or the request for the adjustment is transmitted via an F1 application protocol message, a radio resource control message, or a medium access control element message.

In some cases, the indication of the adjustment includes updated values for the at least one parameters corresponding to the cell coverage, a timing for the adjustment, an identification of a second IAB node corresponding to the cell, a handover request, synchronization signal block parameters, or a combination thereof.

In some cases, the indication of the adjustment includes a handover request indicating one or more child IAB nodes of the first IAB node. In some cases, the indication of the adjustment is received via an F1 application protocol message, a radio resource control message, or a medium access control element message. In some cases, the at least one parameter includes a maximum transmission power, a random access channel configuration, or both.

In some cases, the indication specifies to apply a first transmit power to a first synchronization signal block in a first direction and a second transmit power to a second synchronization signal block in a second direction based on the geographic proximity of the cell. In some cases, the indication specifies to not transmit on at least one synchronization signal block based on the geographic proximity of the cell.

In some cases, the indication of the adjustment specifies to enter into a power saving mode based on the geographic proximity of the cell. In some cases, the indication of the adjustment specifies to reject a random access request.

In some cases, the indication of the adjustment specifies updated values for the at least one parameters corresponding to the cell coverage, a timing for the adjustment, an identification of a second IAB node corresponding to the cell, a handover request, synchronization signal block parameters, or a combination thereof.

The proximity component 755 may receive, from a first integrated access backhaul (IAB) node, an indication of a geographic proximity of a cell relative to the first IAB node.

The measurement component 720 may identify a measurement corresponding to the cell coverage of the first IAB node, where the adjustment is determined based on the identified measurement.

In some examples, the measurement component 720 may perform the measurement of at least one reference signal transmitted by a second IAB node, where the performed measurement indicates the geographic proximity of the cell.

In some examples, the measurement component 720 may perform the measurement of at least one reference signal received from a child IAB node of the first IAB node, where the performed measurement indicates the geographic proximity of the cell.

In some examples, the measurement component 720 may determine that the measurement exceeds a cell measurement threshold, where the adjustment is performed based on determining that the measurement exceeds the cell measurement threshold.

In some examples, the measurement component 720 may receive an indication that the measurement exceeds a cell measurement threshold, where the adjustment is performed based on receiving the indication. In some examples, the measurement component 720 may receive an indication of a measurement corresponding to the cell coverage of the first IAB node indicating the geographic proximity, where the adjustment of the at least one parameter is determined in accordance with the measurement.

In some examples, the measurement component 720 may determine that the measurement exceeds a cell measurement threshold, where the adjustment of the at least one parameter is determined in accordance with determining that the measurement exceeds the cell measurement threshold.

In some cases, the at least one reference signal includes one or more signals of a synchronization signal block, a channel state information reference signal, a demodulation reference signal, or a combination thereof. In some cases, the second IAB node is a parent IAB node of the first IAB node. In some cases, the measurement corresponds to radio resource management for a handover procedure, an inter-relay discovery procedure, or both. In some cases, the at least one reference signal includes a sounding reference signal, a demodulation reference signal, or a combination thereof.

In some cases, the measurement corresponds to a reference signal received power, a reference signal received quality, a signal to interference plus noise ratio, a received signal strength indicator, a channel quality indicator, or a combination thereof.

In some cases, the indication of the measurement is transmitted via an F1 application protocol message, a radio resource control message, or a medium access control element message. In some cases, the measurement corresponds to a one or more signals of a synchronization signal block, a channel state information reference signal, a demodulation reference signal, a sounding reference signal, a reference signal received power, a reference signal received quality, a signal to interference plus noise ratio, a received signal strength indicator, a channel quality indicator, a block error rate performance, or a combination thereof.

In some cases, the measurement corresponds to a child IAB node of the first IAB node, a parent IAB node of the first IAB node, a second IAB node, another wireless communication node, or a combination thereof.

In some cases, the measurement is performed by a mobile-termination unit (e.g., MT element 725) of the first IAB node. In some cases, the measurement is performed by a distributed unit (e.g., DU element 730) of the first IAB node. The measurement interface 735 may receive an indication of the measurement from a second IAB node, where the indication of the measurement corresponds to the geographic proximity of the cell.

In some examples, the measurement interface 735 may transmit an indication of the measurement to a central unit. In some cases, the second IAB node includes a child IAB node of the first IAB node, a parent IAB node of the first IAB node, or another IAB node in the wireless backhaul communications network. The SIB component 740 may broadcast a system information block indicating an updated set of synchronization signal blocks corresponding to the one or more spatial directions.

In some examples, the SIB component 740 may transmit a system information block including the at least one parameter to one or more child IAB nodes served by the first IAB node. The RACH component 745 may reject a random access request from at least one child IAB node of the first IAB node in accordance with the adjusting.

The handover component 750 may perform a handover procedure for one or more user equipments (UEs) served by the first IAB node in accordance with the adjusting.

In some examples, the handover component 750 may identify one or more child IAB nodes served by the first IAB node for a handover procedure based on the determined adjustment. In some examples, the handover component 750 may identify a second IAB node corresponding to the cell as a target IAB node for the handover procedure.

In some examples, the handover component 750 may identify a list of child IAB nodes for a handover procedure based on the measurement, an amount of transmission power reduction, or both. In some examples, the handover component 750 may transmit an indication of the handover procedure to the first IAB node, the second IAB node, or both, In some cases, the one or more child IAB nodes are identified based on an amount of reduction in transmit power by the first IAB node, a signal quality corresponding to the one or more child IAB nodes, or a combination thereof.

In some cases, the signal quality is based on a channel state information report received from the one or more child IAB nodes, sounding reference signal measurements, block error rate performance of the one or more child IAB nodes, or a combination thereof. In some cases, the list is identified based on a signal quality of a channel between each child IAB node and the first IAB node. In some cases, the indication of the handover procedure includes an identification of one or more child IAB nodes for the handover procedure.

The node selection component 760 may select either the first IAB node or a second IAB node corresponding to the cell for the adjustment of the at least one parameter, where the indication of the adjustment is transmitted to either the first IAB node or the second IAB node in accordance with the selecting.

In some examples, the node selection component 760 may identify a first number of child IAB nodes served by the first IAB node and second number of child IAB nodes served by the second IAB node, where either the first IAB node or the second IAB node is selected based on a lower number of the first number and the second number.

In some examples, the node selection component 760 may identify a first mobility state corresponding to the first IAB node and a second mobility state corresponding to the second IAB node, where either the first IAB node or the second IAB node is selected based on a higher mobility between the first mobility state and the second mobility state.

In some examples, the node selection component 760 may identify a first power consumption metric corresponding to the first IAB node and a second power consumption metric corresponding to the second IAB node, where either the first IAB node or the second IAB node is selected based on a higher power consumption between the first power consumption metric and the second power consumption metric.

In some examples, the node selection component 760 may identify a first hop count between the first IAB node and a donor node and a second hop count between the second IAB node and the donor node, where either the first IAB node or the second IAB node is selected based on a higher hop count between the first hop count and the second hop count.

In some examples, the node selection component 760 may transmit an indication of the selection to the first IAB node, the second IAB node, or both.

In some examples, the node selection component 760 may identify a second IAB node corresponding to the cell as a target IAB node for a handover procedure between the first IAB node and the second IAB node.

The policy component 765 may select a power management policy based at least in part on measurement information and a selection criterion, where adjusting the at least one parameter is based at least in part on the selected power management policy.

In some examples, the policy component 765 may receive an indication of the selection criterion. In some examples, the power management policy comprises a formula, a set of configured parameters, or both.

Figure 8:
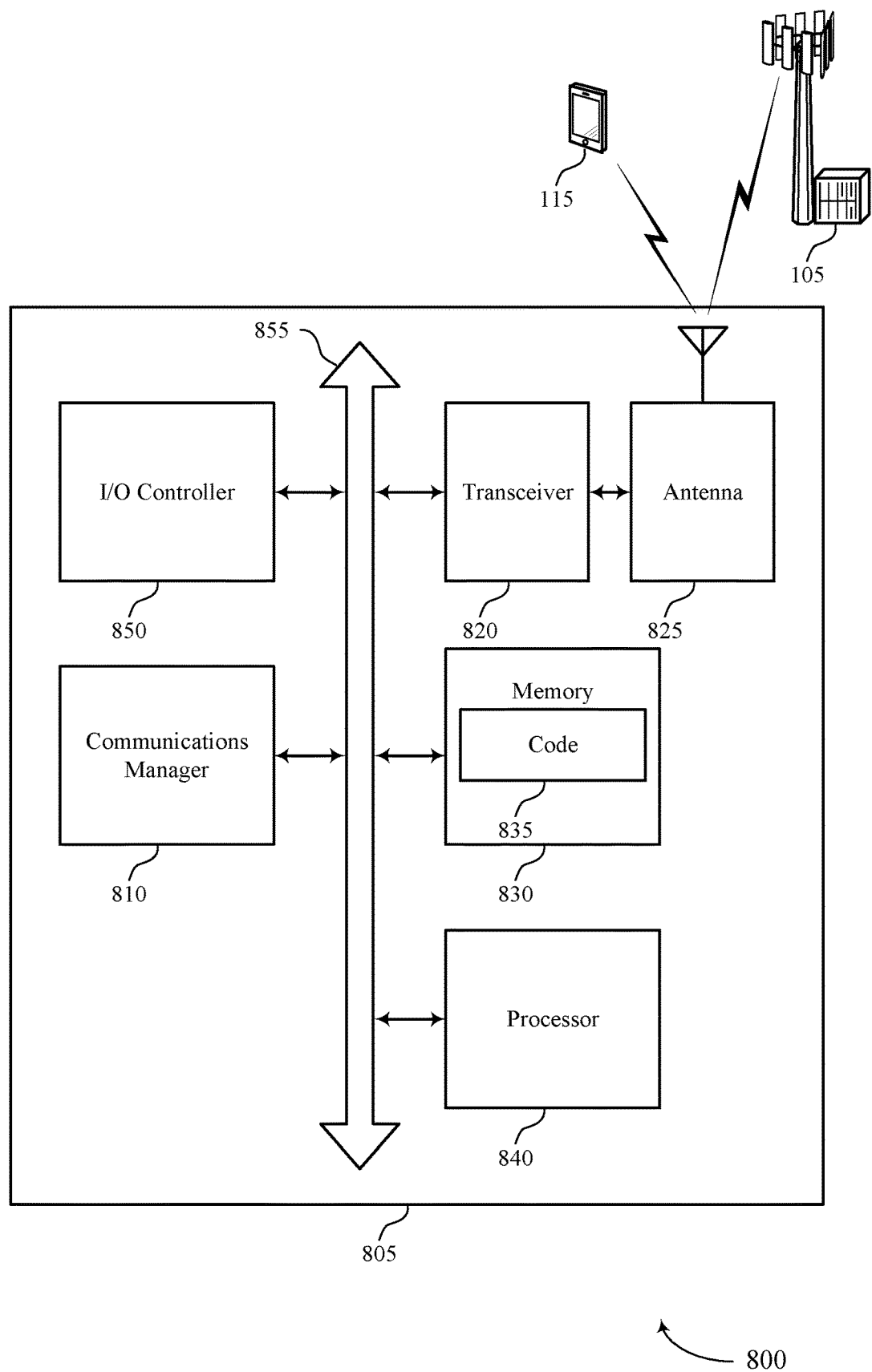
FIG. 8 shows a diagram of a system including a user equipment (UE) that supports IAB node cell coverage adjustment in accordance with aspects of the present disclosure.

FIG. 8 shows a diagram of a system 800 including a device 805 that supports IAB node cell coverage adjustment in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may determine an adjustment to at least one parameter corresponding to a cell coverage of the first IAB node based on a geographic proximity of a cell relative to the first IAB node and transmit an indication of the adjustment to the at least one parameter. The communications manager 810 may also receive, from a first integrated access backhaul (IAB) node, an indication of a geographic proximity of a cell relative to the first IAB node and transmit an indication of an adjustment of at least one parameter corresponding to cell coverage based on receiving the indication of the geographic proximity.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a digital signal processor (DSP), a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting IAB node cell coverage adjustment).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
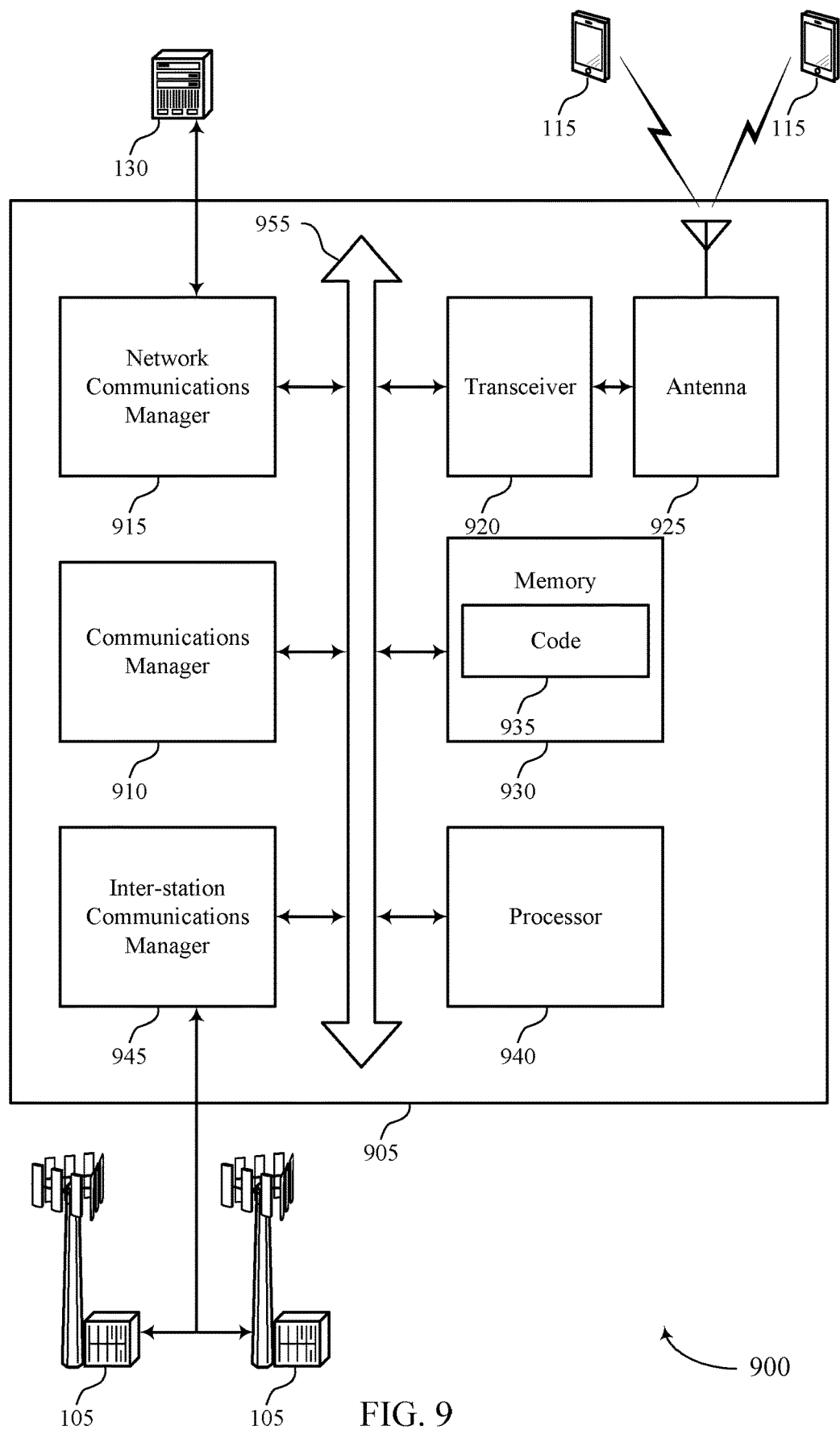
FIG. 9 shows a diagram of a system including a base station that supports IAB node cell coverage adjustment in accordance with aspects of the present disclosure.

FIG. 9 shows a diagram of a system 900 including a device 905 that supports IAB node cell coverage adjustment in accordance with aspects of the present disclosure. The device 905 may be an example of or include the components of device 505, device 605, or an access node 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may determine an adjustment to at least one parameter corresponding to a cell coverage of the first IAB node based on a geographic proximity of a cell relative to the first IAB node and transmit an indication of the adjustment to the at least one parameter. The communications manager 910 may also receive, from a first integrated access backhaul (IAB) node, an indication of a geographic proximity of a cell relative to the first IAB node and transmit an indication of an adjustment of at least one parameter corresponding to cell coverage based on receiving the indication of the geographic proximity.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting IAB node cell coverage adjustment).

Inter-station communications manager 945 may manage communications with other access node 105, and may include a controller or scheduler for controlling communications with UEs 115 in cooperation with other access nodes 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between access nodes 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
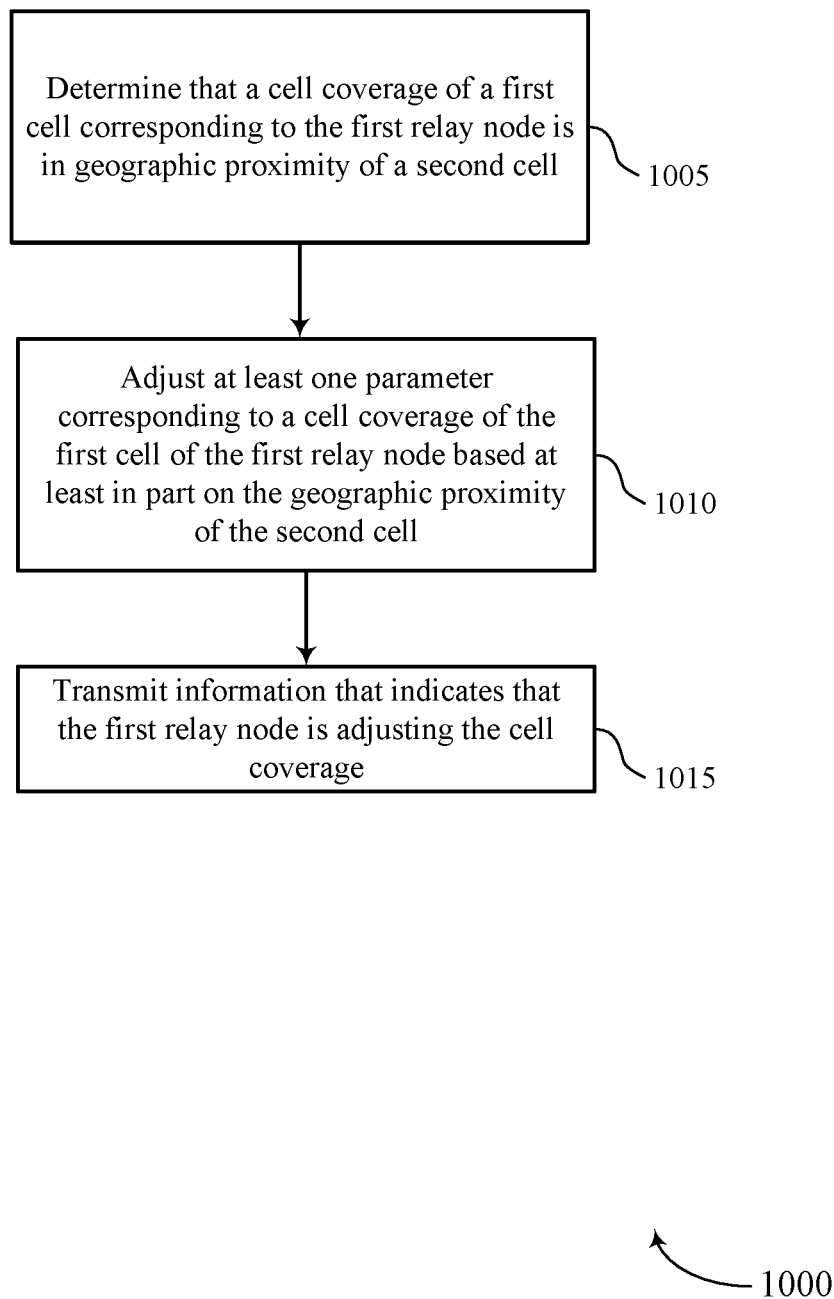
FIGS. 10 through 13 show flowcharts illustrating methods that support IAB node cell coverage adjustment in accordance with aspects of the present disclosure.

FIG. 10 shows a flowchart illustrating a method 1000 that supports IAB node cell coverage adjustment in accordance with aspects of the present disclosure. The operations of method 1000 may be implemented by a UE 115 or access node 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may determine that a first cell corresponding to the first relay node is in geographic proximity of a second cell. The operations of 1005 may be performed according to the methods described herein. In some examples, aspects of the operations of 1005 may be performed by a cell coverage adjustment component as described with reference to FIGS. 5 through 9.

At 1010, the UE or base station may adjust at least one parameter corresponding to a cell coverage of the first IAB node based on a geographic proximity of a cell relative to the first IAB node. The operations of 1010 may be performed according to the methods described herein. In some examples, aspects of the operations of 1010 may be performed by a cell coverage adjustment component as described with reference to FIGS. 5 through 9.

At 1015, the UE or base station may transmit information that indicates that the first relay node is adjusting the cell coverage. The operations of 1015 may be performed according to the methods described herein. In some examples, aspects of the operations of 1015 may be performed by an adjustment indication component as described with reference to FIGS. 5 through 9.

Figure 11:
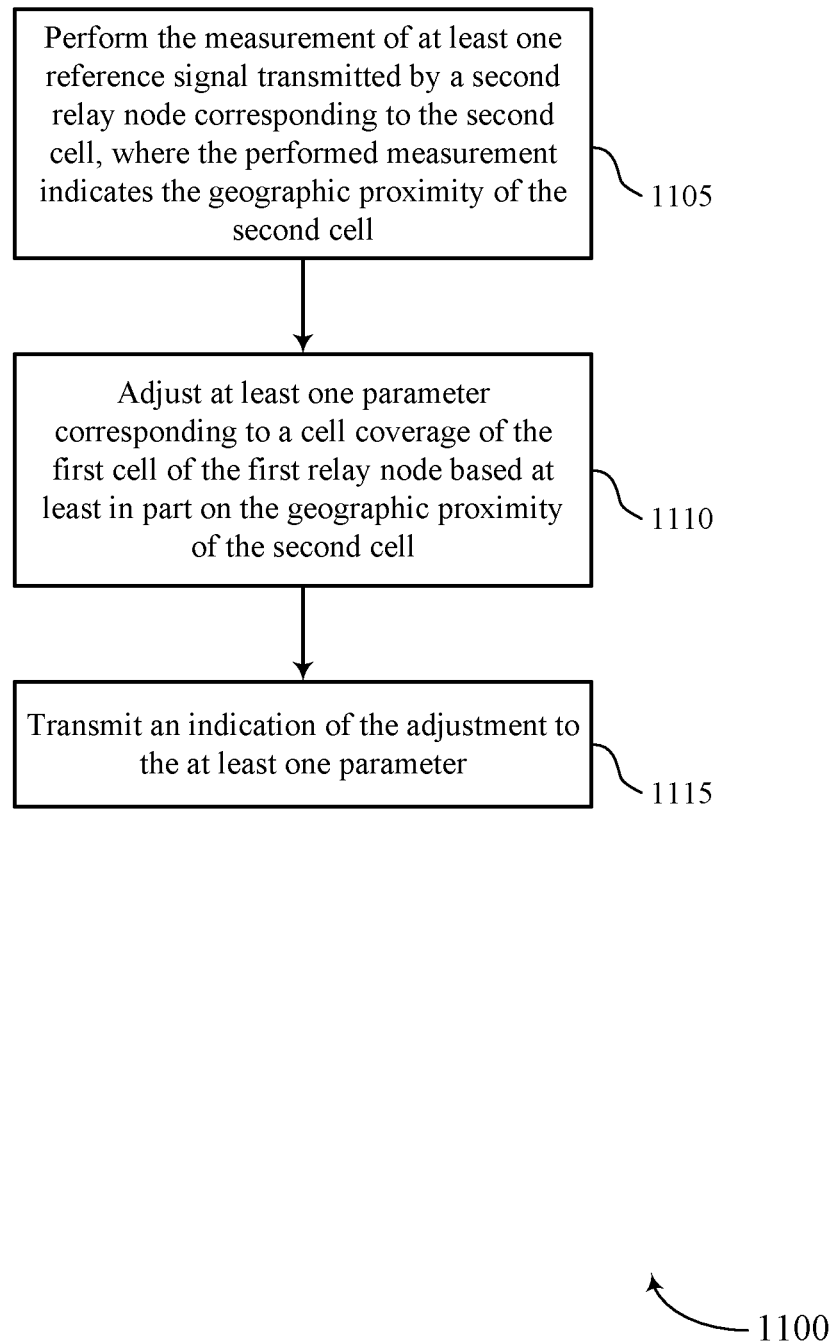

FIG. 11 shows a flowchart illustrating a method 1100 that supports IAB node cell coverage adjustment in accordance with aspects of the present disclosure. The operations of method 1100 may be implemented by a UE 115 or access node 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may perform the measurement of at least one reference signal transmitted by a second relay node corresponding to the second cell, where the performed measurement indicates the geographic proximity of the second cell. The operations of 1105 may be performed according to the methods described herein. In some examples, aspects of the operations of 1105 may be performed by a measurement component as described with reference to FIGS. 5 through 9.

At 1110, the UE or base station may adjust at least one parameter corresponding to a cell coverage of the first IAB node based on a geographic proximity of a cell relative to the first IAB node. The operations of 1115 may be performed according to the methods described herein. In some examples, aspects of the operations of 1115 may be performed by a cell coverage adjustment component as described with reference to FIGS. 5 through 9.

At 1115, the UE or base station may transmit information that indicates that the first relay node is adjusting the cell coverage. The operations of 1120 may be performed according to the methods described herein. In some examples, aspects of the operations of 1120 may be performed by an adjustment indication component as described with reference to FIGS. 5 through 9.

Figure 12:
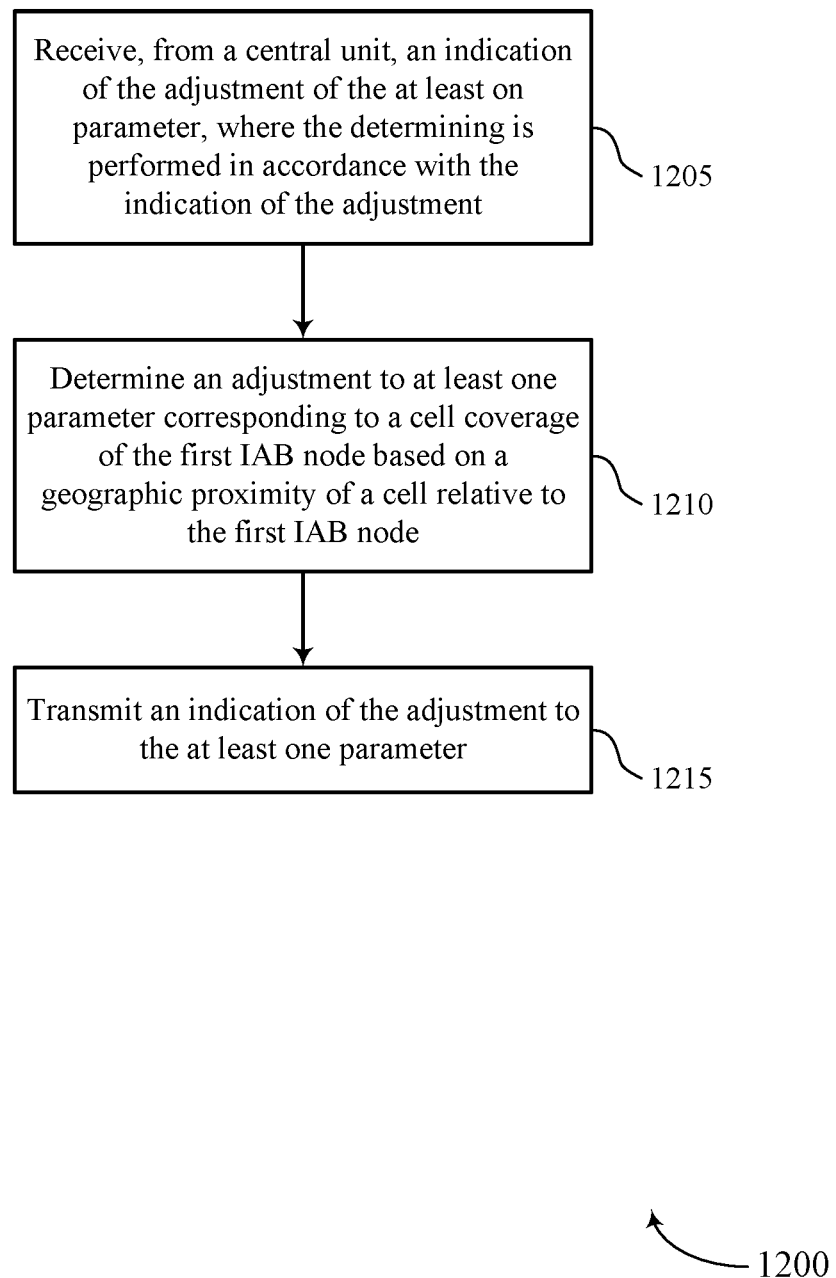

FIG. 12 shows a flowchart illustrating a method 1200 that supports IAB node cell coverage adjustment in accordance with aspects of the present disclosure. The operations of method 1200 may be implemented by a UE 115 or access node 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive, from a central unit, an indication of the adjustment of the at least on parameter, where the determining is performed in accordance with the indication of the adjustment. The operations of 1205 may be performed according to the methods described herein. In some examples, aspects of the operations of 1205 may be performed by an adjustment indication component as described with reference to FIGS. 5 through 9.

At 1210, the UE or base station may determine an adjustment to at least one parameter corresponding to a cell coverage of the first IAB node based on a geographic proximity of a cell relative to the first IAB node. The operations of 1210 may be performed according to the methods described herein. In some examples, aspects of the operations of 1210 may be performed by a cell coverage adjustment component as described with reference to FIGS. 5 through 9.

At 1215, the UE or base station may transmit an indication of the adjustment to the at least one parameter. The operations of 1215 may be performed according to the methods described herein. In some examples, aspects of the operations of 1215 may be performed by an adjustment indication component as described with reference to FIGS. 5 through 9.

Figure 13:
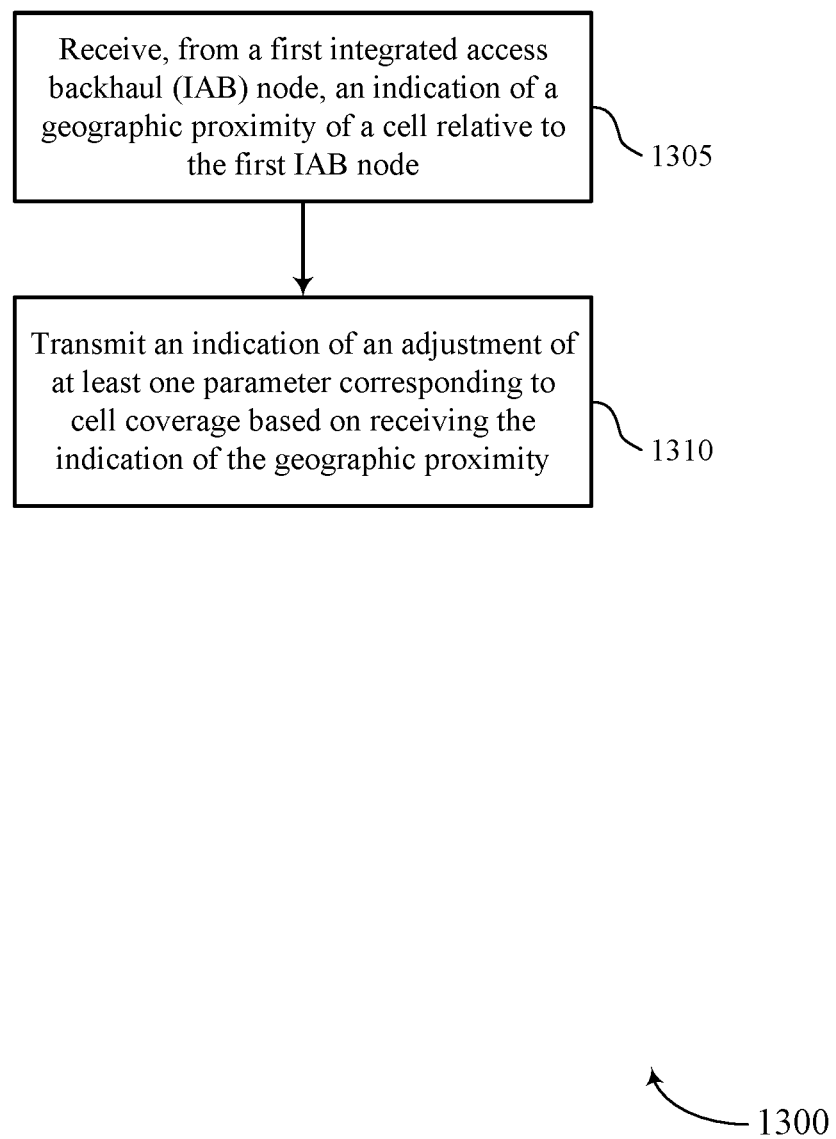

FIG. 13 shows a flowchart illustrating a method 1300 that supports IAB node cell coverage adjustment in accordance with aspects of the present disclosure. The operations of method 1300 may be implemented by a UE 115 or access node 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may receive, from a first integrated access backhaul (IAB) node, an indication of a geographic proximity of a cell relative to the first IAB node. The operations of 1305 may be performed according to the methods described herein. In some examples, aspects of the operations of 1305 may be performed by a proximity component as described with reference to FIGS. 5 through 9.

At 1310, the UE or base station may transmit an indication of an adjustment of at least one parameter corresponding to cell coverage based on receiving the indication of the geographic proximity. The operations of 1310 may be performed according to the methods described herein. In some examples, aspects of the operations of 1310 may be performed by an adjustment indication component as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first relay node of a wireless backhaul communications network, comprising: determining that a cell coverage of a first cell corresponding to the first relay node is in geographic proximity of a second cell; adjusting at least one parameter corresponding to the cell coverage of the first cell of the first relay node based at least in part on the geographic proximity of the second cell; and transmitting information that indicates that the first relay node is adjusting the cell coverage.

Aspect 2: The method of aspect 1, wherein determining that the cell coverage is in geographic proximity of the second cell comprises: identifying that a measurement corresponding to the cell coverage of the first relay node indicates that the cell coverage is interfering with communications in the second cell, that the second cell is interfering with communications in the first cell, or both.

Aspect 3: The method of aspect 2, further comprising: performing the measurement of at least one reference signal transmitted by a second relay node corresponding to the second cell, wherein the performed measurement indicates the geographic proximity of the second cell.

Aspect 4: The method of aspect 3, wherein the second relay node is a parent relay node of the first relay node and the measurement is performed by a mobile-termination unit of the first relay node.

Aspect 5: The method of any of aspects 3 through 4, wherein the second relay node is a child relay node of the first relay node and the measurement is performed by a distributed unit of the first relay node.

Aspect 6: The method of any of aspects 3 through 5, wherein the measurement corresponds to radio resource management for a handover procedure, an inter-relay discovery procedure, or both.

Aspect 7: The method of any of aspects 3 through 6, wherein the at least one reference signal comprises a synchronization signal block, a channel state information reference signal, a demodulation reference signal, a sounding reference signal, or a combination thereof.

Aspect 8: The method of any of aspects 2 through 7, wherein the measurement corresponds to a reference signal received power, a reference signal received quality, a signal-to-interference plus noise ratio, a received signal strength indicator, a channel quality indicator, or a combination thereof.

Aspect 9: The method of any of aspects 2 through 8, further comprising: receiving an indication of the measurement from a second relay node, wherein the indication of the measurement corresponds to the geographic proximity of the second cell.

Aspect 10: The method of any of aspects 2 through 9, further comprising: determining that the measurement exceeds a cell measurement threshold, wherein the adjusting is performed based at least in part on determining that the measurement exceeds the cell measurement threshold.

Aspect 11: The method of any of aspects 2 through 9, further comprising: receiving an indication that the measurement exceeds a cell measurement threshold, wherein the adjusting is performed based at least in part on receiving the indication.

Aspect 12: The method of any of aspects 2 through 11, further comprising: transmitting an indication of the measurement, an indication of the adjusting, or a request for the adjusting to a central unit via an F1 application protocol message, a radio resource control message, or a medium access control element message.

Aspect 13: The method of aspect 12, wherein the indication of the adjusting comprises a list of power management policies, selection criterion associated with power management policies, or both.

Aspect 14: The method of aspect 13, wherein the power manage policy comprises a formula, a set of configured parameters, or both.

Aspect 15: The method of any of aspects 12 through 14, wherein the indication of the adjustment, the indication of the measurement, or the request for the adjustment is transmitted vi an F1 application protocol message, a radio resource control message, or a medium access control layer control element message.

Aspect 16: The method of any of aspects 1 through 15, wherein adjusting the at least one parameter comprises: adjusting a maximum transmission power, adjusting a random access channel configuration, adjusting the cell coverage in one or more spatial directions, or a combination thereof.

Aspect 17: The method of aspect 16, further comprising: broadcasting a system information block indicating an updated set of synchronization signal blocks corresponding to the one or more spatial directions.

Aspect 18: The method of any of aspects 1 through 17, wherein adjusting the at least one parameter comprises: adjusting the cell coverage of the first relay node in one or more spatial directions in accordance with the determining by applying a first transmit power to a first synchronization signal block in a first direction and a second transmit power to a second synchronization signal block in a second direction based at least in part on the geographic proximity of the second cell.

Aspect 19: The method of any of aspects 1 through 17, wherein adjusting the at least one parameter comprises: adjusting the cell coverage of the first relay node in one or more spatial directions in accordance with the determining by determining to not transmit on at least one synchronization signal block based at least in part on the geographic proximity of the second cell.

Aspect 20: The method of any of aspects 1 through 17 and 19, wherein adjusting the at least one parameter comprises: switching to a power saving mode in accordance with the adjusting.

Aspect 21: The method of any of aspects 1 through 20, wherein adjusting the at least one parameter comprises: rejecting a random access request from at least one child relay node of the first relay node in accordance with the adjusting.

Aspect 22: The method of any of aspects 1 through 21, wherein transmitting the information comprises: transmitting an indication of a maximum uplink power to one or more UEs served by the first relay node.

Aspect 23: The method of any of aspects 1 through 22, wherein transmitting the information comprises: performing a handover procedure for one or more UEs served by the first relay node.

Aspect 24: The method of aspect 23, further comprising receiving an indication of the selection criterion.

Aspect 25: The method of any of aspects 1 through 24, further comprising: selecting a power management policy based at least in part on measurement information and a selection criterion, wherein adjusting the at least one parameter is based at least in part on the selected power management policy.

Aspect 26: The method of any of aspects 1 through 25, further comprising: transmitting, to a central unit, an indication of a measurement corresponding to the cell coverage; receiving, from the central unit, an instruction to adjust the at least one parameter based at least in part on transmitting the indication of the measurement, wherein the adjusting is performed in accordance with the instruction.

Aspect 27: The method of aspect 26, wherein the information comprises updated values for the at least one parameters corresponding to the cell coverage, a timing for the adjusting, an identification of a second relay node corresponding to the second cell, a handover request, synchronization signal block parameters, or a combination thereof.

Aspect 28: The method of any of aspects 26 through 27, wherein the indication of the adjusting comprises a handover request indicating one or more child relay nodes of the first relay node.

Aspect 29: The method of any of aspects 1 through 28, further comprising: transmitting a system information block including an indication of the adjusting to the at least one parameter to one or more child relay nodes served by the first relay node.

Aspect 30: The method of any of aspects 1 through 29, further comprising: identifying one or more child relay nodes served by the first relay node for a handover procedure based at least in part on the determined adjusting, an amount of reduction in transmit power by the first relay node, a signal quality corresponding to the one or more child relay nodes, or a combination thereof.

Aspect 31: The method of aspect 30, wherein the signal quality is based at least in part on a channel state information report received from the one or more child relay nodes, sounding reference signal measurements, block error rate performance of the one or more child relay nodes, or a combination thereof.

Aspect 32: The method of any of aspects 30 through 31, further comprising: identifying the second relay node correspond to the cell as a target node for the handover procedure.

Aspect 33: A method for wireless communications at a central unit of a wireless backhaul communications network, comprising: receiving, from a relay node, an indication of a geographic proximity of a cell relative to the first relay node; and transmitting an indication of an adjustment of at least one parameter corresponding to cell coverage based at least in part on receiving the indication of the geographic proximity.

Aspect 34: The method of aspect 33, wherein receiving the indication comprises: receiving an indication of a measurement corresponding to the cell coverage of the first relay node indicating the geographic proximity, wherein the adjustment of the at least one parameter is determined in accordance with the measurement.

Aspect 35: The method of aspect 34, wherein the measurement corresponds to a one or more signals of a synchronization signal block, a channel state information reference signal, a demodulation reference signal, a sounding reference signal, a reference signal received power, a reference signal received quality, a signal to interference plus noise ratio, a received signal strength indicator, a channel quality indicator, a block error rate performance, or a combination thereof.

Aspect 36: The method of any of aspects 34 through 35, wherein the measurement corresponds to a child relay node of the first relay node, a parent relay node of the first relay node, a second relay node, another wireless communication node, or a combination thereof.

Aspect 37: The method of any of aspects 34 through 36, further comprising: determining that the measurement exceeds a cell measurement threshold, wherein the adjustment of the at least one parameter is determined in accordance with determining that the measurement exceeds the cell measurement threshold.

Aspect 38: The method of any of aspects 34 through 37, further comprising: identifying a list of child relay nodes for a handover procedure based at least in part on the measurement, an amount of transmission power reduction, or both.

Aspect 39: The method of aspect 38, wherein the list is identified based at least in part on a signal quality of a channel between each child relay node and the first relay node.

Aspect 40: The method of any of aspects 33 through 39, further comprising: transmitting the indication of the adjustment to the first relay node, a second relay node corresponding to the cell, or a combination thereof.

Aspect 41: The method of any of aspects 33 through 40, wherein the at least one parameter comprises a maximum transmission power, a random access channel configuration, or both.

Aspect 42: The method of any of aspects 33 through 41, wherein transmitting the indication of the adjustment of the at least one parameter comprises: transmitting the indication to adjust the cell coverage in one or more spatial directions.

Aspect 43: The method of aspect 42, wherein the indication specifies to apply a first transmit power to a first synchronization signal block in a first direction and a second transmit power to a second synchronization signal block in a second direction based at least in part on the geographic proximity of the cell.

Aspect 44: The method of any of aspects 42 through 43, wherein the indication specifies to not transmit on at least one synchronization signal block based at least in part on the geographic proximity of the cell.

Aspect 45: The method of any of aspects 33 through 42, wherein the indication of the adjustment specifies to enter into a power saving mode based at least in part on the geographic proximity of the cell.

Aspect 46: The method of any of aspects 33 through 45, wherein the indication of the adjustment specifies to reject a random access request.

Aspect 47: The method of any of aspects 33 through 46, wherein the indication of the adjustment specifies updated values for the at least one parameters corresponding to the cell coverage, a timing for the adjustment, an identification of a second relay node corresponding to the cell, a handover request, synchronization signal block parameters, or a combination thereof.

Aspect 48: The method of any of aspects 33 through 47, wherein the indication of the adjustment comprises a list of power management policies, a selection criterion for power management policies, or both.

Aspect 49: The method of any of aspects 33 through 48, wherein receiving the indication of the geographic proximity comprises: receiving a request to adjust the at least one parameter from the first relay node, wherein the indication of the adjustment is transmitted in accordance with the request.

Aspect 50: The method of any of aspects 33 through 49, further comprising: selecting either the first relay node or a second relay node corresponding to the cell for the adjustment of the at least one parameter, wherein the indication of the adjustment is transmitted to either the first relay node or the second relay node in accordance with the selecting.

Aspect 51: The method of aspect 50, further comprising: identifying a first number of child relay nodes served by the first relay node and second number of child relay nodes served by the second relay node, wherein either the first relay node or the second relay node is selected based at least in part on a lower number of the first number and the second number.

Aspect 52: The method of any of aspects 50 through 51, further comprising: identifying a first mobility state corresponding to the first relay node and a second mobility state corresponding to the second relay node, wherein either the first relay node or the second relay node is selected based at least in part on a higher mobility between the first mobility state and the second mobility state.

Aspect 53: The method of any of aspects 50 through 52, further comprising: identifying a first power consumption metric corresponding to the first relay node and a second power consumption metric corresponding to the second relay node, wherein either the first relay node or the second relay node is selected based at least in part on a higher power consumption between the first power consumption metric and the second power consumption metric.

Aspect 54: The method of any of aspects 50 through 53, further comprising: identifying a first hop count between the first relay node and a donor node and a second hop count between the second relay node and the donor node, wherein either the first relay node or the second relay node is selected based at least in part on a higher hop count between the first hop count and the second hop count.

Aspect 55: The method of any of aspects 50 through 54, further comprising: transmitting an indication of the selection to the first relay node, the second relay node, or both.

Aspect 56: The method of any of aspects 33 through 55, further comprising: identifying a second relay node corresponding to the cell as a target relay node for a handover procedure between the first relay node and the second relay node.

Aspect 57: The method of aspect 56, further comprising: transmitting an indication of the handover procedure to the first relay node, the second relay node, or both, Aspect 58: The method of aspect 57, wherein the indication of the handover procedure includes an identification of one or more child relay nodes for the handover procedure.

Aspect 59: The method of any of aspects 33 through 58, further comprising: receiving the indication via a F1 application protocol message or a radio resource control message.

Aspect 60: The method of any of aspects 33 through 59, further comprising: transmitting the indication via a F1 application protocol message or a radio resource control message.

Aspect 61: An apparatus for wireless communications at a first relay node of a wireless backhaul communications network, comprising a processor; memory coupled with the processor; and instructions stored in the memory and executable by the processor to cause the apparatus to perform a method of any of aspects 1 through 32.

Aspect 62: An apparatus for wireless communications at a first relay node of a wireless backhaul communications network, comprising at least one means for performing a method of any of aspects 1 through 32.

Aspect 63: A non-transitory computer-readable medium storing code for wireless communications at a first relay node of a wireless backhaul communications network, the code comprising instructions executable by a processor to perform a method of any of aspects 1 through 32.

Aspect 64: An apparatus for wireless communications at a central unit of a wireless backhaul communications network, comprising a processor; memory coupled with the processor; and instructions stored in the memory and executable by the processor to cause the apparatus to perform a method of any of aspects 33 through 60.

Aspect 65: An apparatus for wireless communications at a central unit of a wireless backhaul communications network, comprising at least one means for performing a method of any of aspects 33 through 60.

Aspect 66: A non-transitory computer-readable medium storing code for wireless communications at a central unit of a wireless backhaul communications network, the code comprising instructions executable by a processor to perform a method of any of aspects 33 through 60.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first relay node of a wireless backhaul communications network, comprising:
   determining that a cell coverage of a first cell corresponding to the first relay node is in geographic proximity of a second cell;

adjusting at least one parameter corresponding to the cell coverage of the first cell of the first relay node based at least in part on the geographic proximity of the second cell; and transmitting information that indicates that the first relay node is adjusting the cell coverage.

2. The method of claim 1, wherein determining that the cell coverage is in geographic proximity of the second cell comprises:

identifying that a measurement corresponding to the cell coverage of the first relay node indicates that the cell coverage is interfering with communications in the second cell, that the second cell is interfering with communications in the first cell, or both.

3. The method of claim 2, further comprising:

performing the measurement of at least one reference signal transmitted by a second relay node corresponding to the second cell, wherein the performed measurement indicates the geographic proximity of the second cell.

4. The method of claim 3, wherein the second relay node is a parent relay node of the first relay node and the measurement is performed by a mobile-termination unit of the first relay node.

5. The method of claim 3, wherein the second relay node is a child relay node of the first relay node and the measurement is performed by a distributed unit of the first relay node.

6. The method of claim 3, wherein the measurement corresponds to radio resource management for a handover procedure, an inter-relay discovery procedure, or both.

7. The method of claim 2, further comprising:

receiving an indication of the measurement from a second relay node, wherein the indication of the measurement corresponds to the geographic proximity of the second cell.

8. The method of claim 2, further comprising:

determining that the measurement exceeds a cell measurement threshold, wherein the adjusting is performed based at least in part on determining that the measurement exceeds the cell measurement threshold.

9. The method of claim 2, further comprising:

receiving an indication that the measurement exceeds a cell measurement threshold, wherein the adjusting is performed based at least in part on receiving the indication.

10. The method of claim 2, further comprising:

transmitting an indication of the measurement, an indication of the adjusting, or a request for the adjusting to a central unit via an F1 application protocol message, a radio resource control message, or a medium access control element message.

11. The method of claim 10, wherein the indication of the adjusting comprises a list of power management policies, selection criterion associated with power management policies, or both.

12. The method of claim 1, wherein adjusting the at least one parameter comprises:

adjusting a maximum transmission power, adjusting a random access channel configuration, adjusting the cell coverage in one or more spatial directions, or a combination thereof.

13. The method of claim 12, further comprising:

broadcasting a system information block indicating an updated set of synchronization signal blocks corresponding to the one or more spatial directions.

14. The method of claim 1, wherein adjusting the at least one parameter comprises:

adjusting the cell coverage of the first relay node in one or more spatial directions in accordance with the determining by applying a first transmit power to a first synchronization signal block in a first direction and a second transmit power to a second synchronization signal block in a second direction based at least in part on the geographic proximity of the second cell.

15. The method of claim 1, wherein adjusting the at least one parameter comprises:

adjusting the cell coverage of the first relay node in one or more spatial directions in accordance with the determining by determining to not transmit on at least one synchronization signal block based at least in part on the geographic proximity of the second cell.

16. The method of claim 1, wherein adjusting the at least one parameter comprises:

switching to a power saving mode in accordance with the adjusting.

17. The method of claim 1, wherein adjusting the at least one parameter comprises:

rejecting a random access request from at least one child relay node of the first relay node in accordance with the adjusting.

18. The method of claim 1, wherein transmitting the information comprises:

transmitting an indication of a maximum uplink power to one or more user equipments (UEs) served by the first relay node.

19. The method of claim 1, wherein transmitting the information comprises:

performing a handover procedure for one or more user equipments (UEs) served by the first relay node.

20. The method of claim 1, further comprising:

selecting a power management policy based at least in part on measurement information and a selection criterion, wherein adjusting the at least one parameter is based at least in part on the selected power management policy.

21. The method of claim 19, further comprising:
receiving an indication of the selection criterion.

22. The method of claim 1, further comprising:

transmitting, to a central unit, an indication of a measurement corresponding to the cell coverage;

receiving, from the central unit, an instruction to adjust the at least one parameter based at least in part on transmitting the indication of the measurement, wherein the adjusting is performed in accordance with the instruction.

23. The method of claim 22, wherein the information comprises updated values for the at least one parameters corresponding to the cell coverage, a timing for the adjusting, an identification of a second relay node corresponding to the second cell, a handover request, synchronization signal block parameters, or a combination thereof.

24. The method of claim 22, wherein the indication of the adjusting comprises a handover request indicating one or more child relay nodes of the first relay node.

25. The method of claim 1, further comprising:

transmitting a system information block including an indication of the adjusting to the at least one parameter to one or more child relay nodes served by the first relay node.

26. The method of claim 1, further comprising:

identifying one or more child relay nodes served by the first relay node for a handover procedure based at least in part on the determined adjusting, an amount of reduction in transmit power by the first relay node, a signal quality corresponding to the one or more child relay nodes, or a combination thereof.

27. The method of claim 26, wherein the signal quality is based at least in part on a channel state information report received from the one or more child relay nodes, sounding reference signal measurements, block error rate performance of the one or more child relay nodes, or a combination thereof.

28. An apparatus for wireless communications at a first relay node of a wireless backhaul communications network, comprising:
 a processor,
 memory coupled with the processor; and
 instructions stored in the memory and executable by the processor to cause the apparatus to:
 determine that a cell coverage of a first cell corresponding to the first relay node is in geographic proximity of a second cell;
 adjust at least one parameter corresponding to the cell coverage of the first cell of the first relay node based at least in part on the geographic proximity of the second cell; and
 transmit information that indicates that the first relay node is adjusting the cell coverage.

29. An apparatus for wireless communications at a first relay node of a wireless backhaul communications network, comprising:
 relay node means for determining that a cell coverage of a first cell corresponding to the first relay node is in geographic proximity of a second cell;
 relay node means for adjusting at least one parameter corresponding to the cell coverage of the first cell of the first relay node based at least in part on the geographic proximity of the second cell; and
 relay node means for transmitting information that indicates that the first relay node is adjusting the cell coverage.

30. A non-transitory computer-readable medium storing code for wireless communications at a first relay node of a wireless backhaul communications network, the code comprising instructions executable by a processor to:
 determine that a cell coverage of a first cell corresponding to the first relay node is in geographic proximity of a second cell;
 adjust at least one parameter corresponding to the cell coverage of the first cell of the first relay node based at least in part on the geographic proximity of the second cell; and
 transmit information that indicates that the first relay node is adjusting the cell coverage.

* * * * *